US012587215B2

(12) United States Patent
Sambhwani et al.

(10) Patent No.: US 12,587,215 B2
(45) Date of Patent: Mar. 24, 2026

(54) RADIO ACCESS TECHNOLOGY (RAT) SPECTRUM TRANSLATOR

(71) Applicant: Apple Inc., Cupertino, CA (US)

(72) Inventors: Sharad Sambhwani, San Diego, CA (US); Wanlu Sun, San Diego, CA (US)

(73) Assignee: Apple Inc., Cupertino, CA (US)

( * ) Notice: Subject to any disclaimer, the term of this patent is extended or adjusted under 35 U.S.C. 154(b) by 169 days.

(21) Appl. No.: 18/085,133

(22) Filed: Dec. 20, 2022

(65) Prior Publication Data

US 2024/0097710 A1      Mar. 21, 2024

Related U.S. Application Data

(60) Provisional application No. 63/408,314, filed on Sep. 20, 2022.

(51) Int. Cl.
| | |
|---|---|
| *H04B 1/00* | (2006.01) |
| *H04L 69/08* | (2022.01) |
| *H04W 56/00* | (2009.01) |
| *H04W 72/12* | (2023.01) |
| *H04W 88/06* | (2009.01) |

(52) U.S. Cl.
CPC .............. *H04B 1/005* (2013.01); *H04L 69/08* (2013.01); *H04W 56/001* (2013.01); *H04W 72/1215* (2013.01); *H04W 88/06* (2013.01)

(58) Field of Classification Search
CPC ...... H04B 1/005; H04L 69/08; H04W 56/001; H04W 72/1215; H04W 88/06
See application file for complete search history.

(56) References Cited

U.S. PATENT DOCUMENTS

| | | | | |
|---|---|---|---|---|
| 5,970,410 A | * | 10/1999 | Carney | ................. H04W 16/26 |
| | | | | 455/448 |
| 6,370,185 B1 | * | 4/2002 | Schmutz | .............. H04B 7/2606 |
| | | | | 455/17 |
| 9,973,257 B1 | | 5/2018 | Sung | |
| 11,032,007 B1 | * | 6/2021 | Parker | .................... H04B 10/29 |
| 11,765,616 B2 | * | 9/2023 | Zhang | .............. H04W 28/0263 |
| | | | | 370/229 |
| 2009/0278596 A1 | | 11/2009 | Rofougaran | |

(Continued)

FOREIGN PATENT DOCUMENTS

| | | | | |
|---|---|---|---|---|
| WO | | 2010082883 A1 | 7/2010 | |
| WO | | WO-2023117029 A1 | * 6/2023 | |
| WO | | WO-2023245568 A1 | * 12/2023 | ...... H04W 36/00835 |

OTHER PUBLICATIONS

"5G; Study on channel model for frequencies from 0.5 to 100 GHz (3GPP TR 38.901 version 17.0.0 Release 17)" ETSI TR 138 901 V17.0.0, Apr. 2022, 100 pages.

(Continued)

*Primary Examiner* — Shah M Rahman
(74) *Attorney, Agent, or Firm* — FLETCHER YODER PC

(57) ABSTRACT

Systems and methods described herein may introduce an intermediary device between radio access networks using a first spectrum and user equipment using a second spectrum. The intermediary device may process communication signals from either the first spectrum or the second spectrum into a format usable by the other of the first spectrum or the second spectrum. The intermediary device may be referred to as a multi-radio access technology (multi-RAT) translator.

19 Claims, 29 Drawing Sheets

(56)　　　　References Cited

U.S. PATENT DOCUMENTS

| | | | |
|---|---|---|---|
| 2012/0196528 A1 | 8/2012 | Kazmi et al. | |
| 2012/0307917 A1 | 12/2012 | Goldhamer | |
| 2013/0028170 A1* | 1/2013 | Periyalwar | H04B 7/15542 370/315 |
| 2014/0293883 A1 | 10/2014 | Wang et al. | |
| 2016/0381690 A1* | 12/2016 | Kim | H04W 72/541 370/329 |
| 2017/0093480 A1 | 3/2017 | Ijaz et al. | |
| 2018/0213379 A1 | 7/2018 | Xiong et al. | |
| 2018/0324842 A1 | 11/2018 | Gulati et al. | |
| 2018/0343653 A1 | 11/2018 | Guo | |
| 2020/0077434 A1* | 3/2020 | Kim | H04W 72/0446 |
| 2020/0351774 A1 | 11/2020 | Liao et al. | |
| 2020/0382200 A1 | 12/2020 | Hormis et al. | |
| 2020/0396701 A1 | 12/2020 | Yi et al. | |
| 2021/0007083 A1* | 1/2021 | Yoon | H04L 27/26536 |
| 2021/0014656 A1 | 1/2021 | Mueck et al. | |
| 2021/0036989 A1* | 2/2021 | Fong | H04L 63/18 |
| 2021/0259034 A1 | 8/2021 | Damnjanovic et al. | |
| 2021/0273773 A1* | 9/2021 | Yi | H04L 5/1461 |
| 2021/0289529 A1* | 9/2021 | Hosseini | H04W 72/044 |
| 2021/0337054 A1* | 10/2021 | Choi | H01Q 5/20 |
| 2021/0409102 A1 | 12/2021 | Tarighat | |
| 2022/0077922 A1* | 3/2022 | Abedini | H04L 5/0053 |
| 2022/0183006 A1 | 6/2022 | Mauritz et al. | |
| 2022/0256543 A1 | 8/2022 | Tian et al. | |
| 2022/0286339 A1* | 9/2022 | Lei | H04B 1/005 |
| 2022/0295422 A1 | 9/2022 | Wang et al. | |
| 2022/0322339 A1* | 10/2022 | Park | G01K 1/026 |
| 2022/0330187 A1* | 10/2022 | Cheng | H04W 56/004 |
| 2022/0337473 A1* | 10/2022 | Lin | H04B 7/0617 |
| 2022/0360629 A1* | 11/2022 | Dziekonski | H05B 47/105 |
| 2022/0369264 A1* | 11/2022 | Cheng | H04W 56/0045 |
| 2023/0007483 A1 | 1/2023 | Mueck et al. | |
| 2023/0113173 A1 | 4/2023 | Tsai | |
| 2023/0113562 A1 | 4/2023 | Tsai | |
| 2023/0247596 A1 | 8/2023 | Selvanesan et al. | |
| 2023/0344561 A1 | 10/2023 | Guo et al. | |
| 2023/0370232 A1 | 11/2023 | Liu et al. | |
| 2023/0371089 A1 | 11/2023 | Liu et al. | |
| 2023/0379755 A1 | 11/2023 | Wang et al. | |
| 2024/0049140 A1 | 2/2024 | Xu et al. | |
| 2024/0114487 A1 | 4/2024 | Tsai et al. | |
| 2024/0137921 A1* | 4/2024 | Kim | H04B 17/309 |
| 2025/0088883 A1 | 3/2025 | Rao et al. | |

OTHER PUBLICATIONS

Invitation and Partial Search Report for PCT Application No. PCT/US2023/033123 dated Feb. 13, 2024; 21 pgs.

* cited by examiner

RADIO ACCESS TECHNOLOGY (RAT) SPECTRUM TRANSLATOR

CROSS-REFERENCE TO RELATED APPLICATIONS

This application claims priority to U.S. Provisional Application No. 63/408,314, filed Sep. 20, 2022, entitled "Radio Access Technology (RAT) Spectrum Translator," the disclosure of which is incorporated by reference herein in its entirety for all purposes.

BACKGROUND

The present disclosure relates generally to wireless communication, and more specifically to enhanced data communication between wireless communication devices.

In an electronic device, a transmitter and a receiver may each be coupled to one or more antennas to enable the electronic device to both transmit and receive wireless signals. These wireless signals are transmitted according to frequency bands assigned by a network operator. Currently, 5$^{th}$ Generation (5G)/New Radio (NR) and earlier technologies are deployed. It may be desired to increase bandwidths to meet increasing demand of relatively high data consumption applications, such as virtual reality applications, augmented reality applications, machine learning applications, and the like. However, some systems deployed in the current 5G spectrum (e.g., Frequency Range 1 (1-R1) and Frequency Range 2 (1-R2)) may not utilize full data rates and connectivity available to 5G NR network devices. For example, a 5G NR enhanced mobile broadband (eMBB) network may provide higher data rates and connectivity that are unable to be used by current technologies in cell-edge and indoor use cases.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an electronic device includes a receiver and a transmitter. The electronic device may also include processing circuitry coupled to the receiver and the transmitter. The processing circuitry may receive a signal from a base station having a first frequency in a first frequency spectrum at the receiver. The processing circuitry may convert the signal from the first frequency to a second frequency in a second frequency spectrum. The processing circuitry may transmit the signal having the second frequency to user equipment using the transmitter.

In some cases, the first frequency spectrum includes frequencies between 0.40 gigahertz (GHz) and 7.2 GHz, and the second frequency spectrum includes frequencies between 24 gigahertz and 52.6 GHz. The second frequency spectrum may include frequencies different from the first frequency spectrum. The first frequency spectrum may include frequencies between 4 gigahertz (GHz) and 7 GHz and/or the second frequency spectrum may include frequencies between 100 GHz and 1000 GHz.

In some cases, the processing circuitry may convert the signal from the first frequency to the second frequency by performing an analog-to-digital conversion, a cyclic prefix (CP) removal operation, a demodulation operation, a modulation operation, a baseband digital processing operation, reference signal addition operation, a channel coding operation, or any combination thereof. In some cases, the processing circuitry may convert the signal from the first frequency to the second frequency at least in part by removing a first cyclic prefix (CP) of the signal to generate a first signal, translating the first signal to the second frequency to generate a second signal, adding a second cyclic prefix to the second signal based on the second frequency spectrum to generate a third signal, and converting the third signal to an analog signal to generate the signal having the second frequency. In these cases, translating the first signal to the second frequency may include changing a carrier frequency of the first signal from a first frequency to a second frequency when generating the second signal, where the second frequency spectrum communicates based on frequency multiplexing operations. Furthermore, sometimes in these cases, the processing circuitry may demodulate the first signal before translating the first signal to the second frequency. In some cases, the processing circuitry may add a reference signal to the signal having the second frequency prior to transmission. In some cases, the processing circuitry may convert signals including the signal from a first number of layers to a second number of layers corresponding to the second frequency spectrum prior to transmission to the user equipment, and where a respective layer may be a data channel separated in space from other layers used to transmit other signals of the plurality of signals.

In another embodiment, a method may include receiving, via a translator device, an input signal from the base station via a first frequency spectrum. The translator device may intercept communications between a base station and user equipment. The method may include generating, via the translator device, an output signal communicable on a second frequency spectrum based on the input signal. The method may also include transmitting, via the translator device, the output signal to the user equipment via the second frequency spectrum. In yet another embodiment, a system includes a first device that uses a first frequency spectrum, a second device that uses a second frequency spectrum, and an intermediary device coupled to the first device and the second device. The intermediary device receives a message from the first device via the first frequency spectrum, processes the message from the first device to generate a processed message, and transmits the processed message to the second device via the second frequency spectrum.

The method may sometimes include receiving, via the translator device, the input signal via an antenna, converting, via the translator device, the input signal to a bit domain to generate a digital signal; removing, via the translator device, a cyclic prefix associated with the digital signal to generate an intermediate signal; demodulating, via the translator device, the intermediate signal to generate a second intermediate signal; and translating, via the translator device, the second intermediate signal between the first frequency spectrum and the second frequency spectrum to generate the output signal communicable on the second frequency spectrum. Furthermore, the method may also include adding, via the translator device, a reference signal associated with the second frequency spectrum to the output signal before transmitted via the second frequency spectrum. In some cases, the method of generating, via the translator device, the output signal may include generating, via the translator device, the output signal communicable on the second frequency spectrum based on the input signal and a conversion from a spatial diversity data format to a frequency diversity data format. In some cases, the method of generating, via the translator device, the output signal may include translating between a spatial multiplexing data format and a time multiplexing data format.

In yet another embodiment, a system may include a first device that uses a first frequency spectrum. The system may include a second device that uses a second frequency spectrum. The system may include an intermediary device coupled to the first device and the second device. The intermediary device may receive an input signal having a first frequency of the first frequency spectrum from the first device. The intermediary device may generate a second signal having a second frequency of the second frequency spectrum from the first device. Furthermore, the intermediary device may and transmit the second signal to the second device.

In some cases, the intermediary device may receive the input signal via eight antennas and may transmit the output signal via four antennas. In some cases, the second frequency spectrum may include frequencies higher than the first frequency spectrum. In some cases, the intermediary device may generate the second signal having the second frequency based on adjusting the input signal to have a frequency diversity data format. In some cases, the second device may receive the second signal having the second frequency of the second frequency spectrum, and generate a down-converted signal having the first frequency of the first frequency spectrum based on the second signal.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

Figure 1:
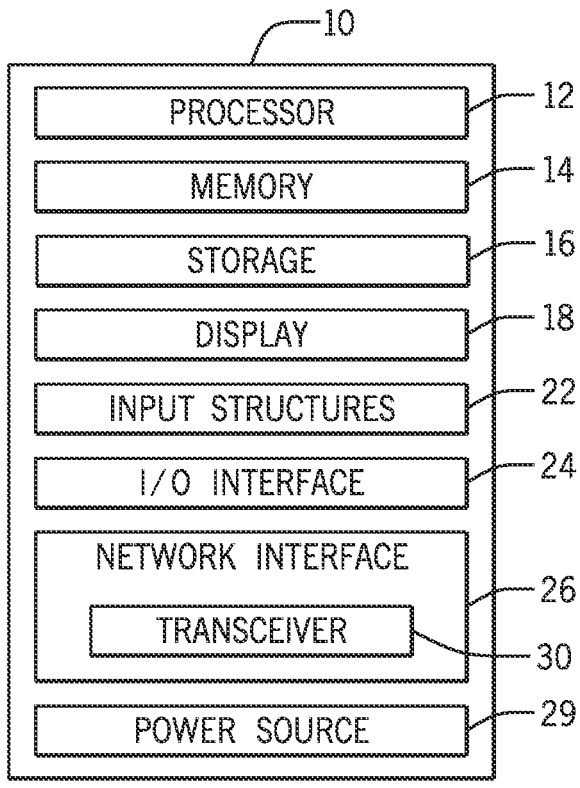
FIG. 1 is a block diagram of an electronic device, according to embodiments of the present disclosure.
Figure 6:
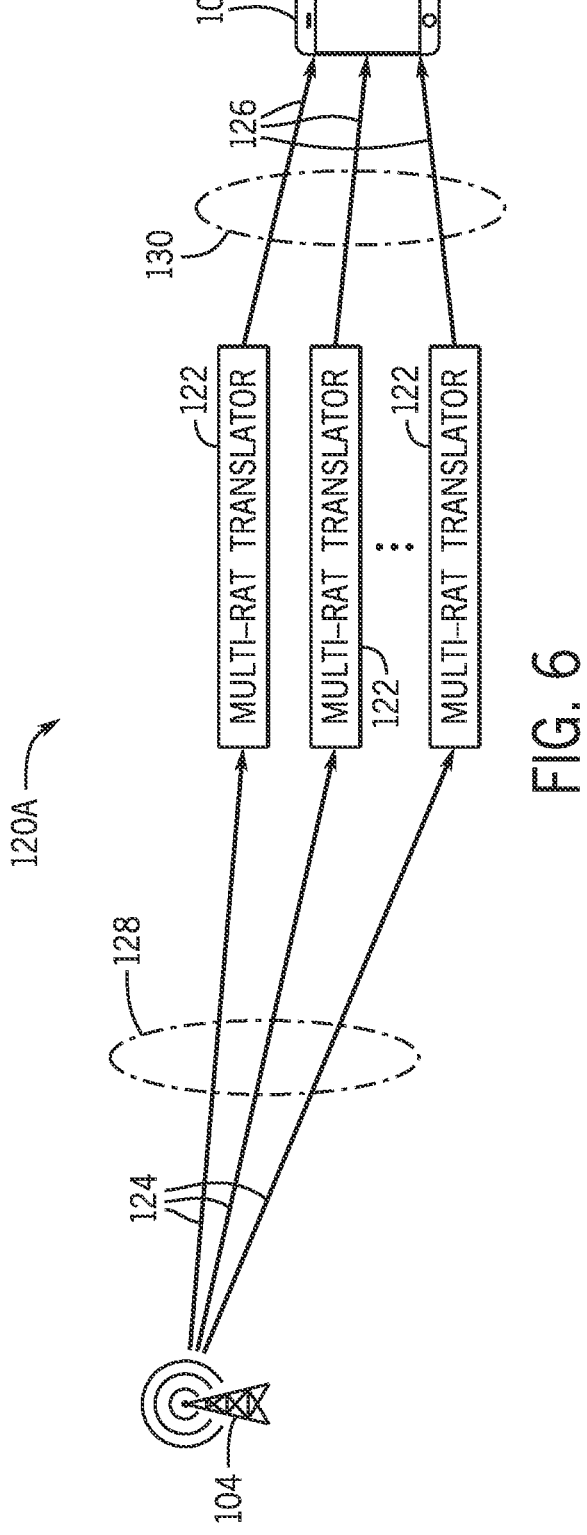
FIG. 6 is a block diagram of a first example system that implements a multi-radio access technology (multi-RAT)
Figure 7:
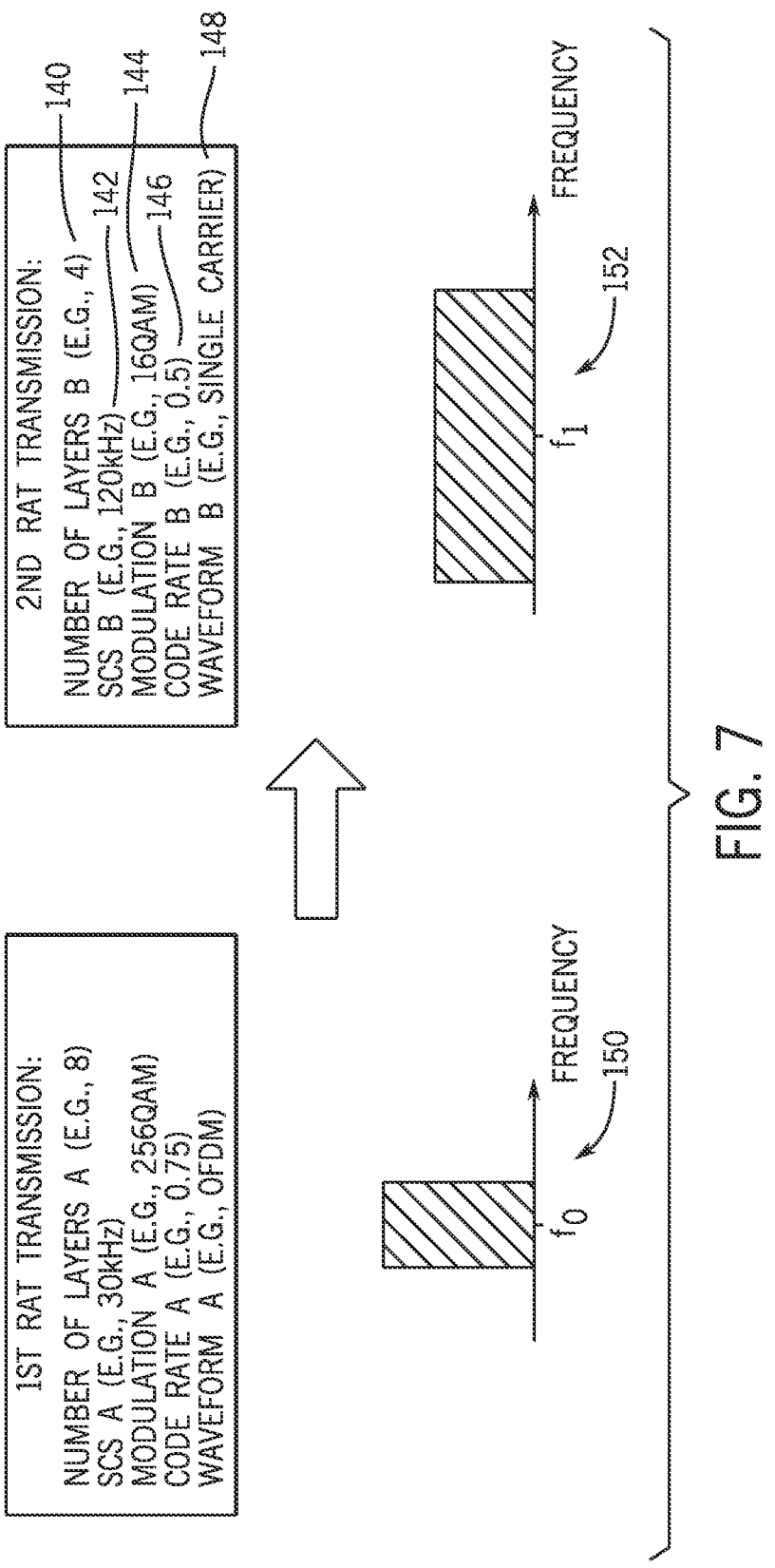
Figure 8:
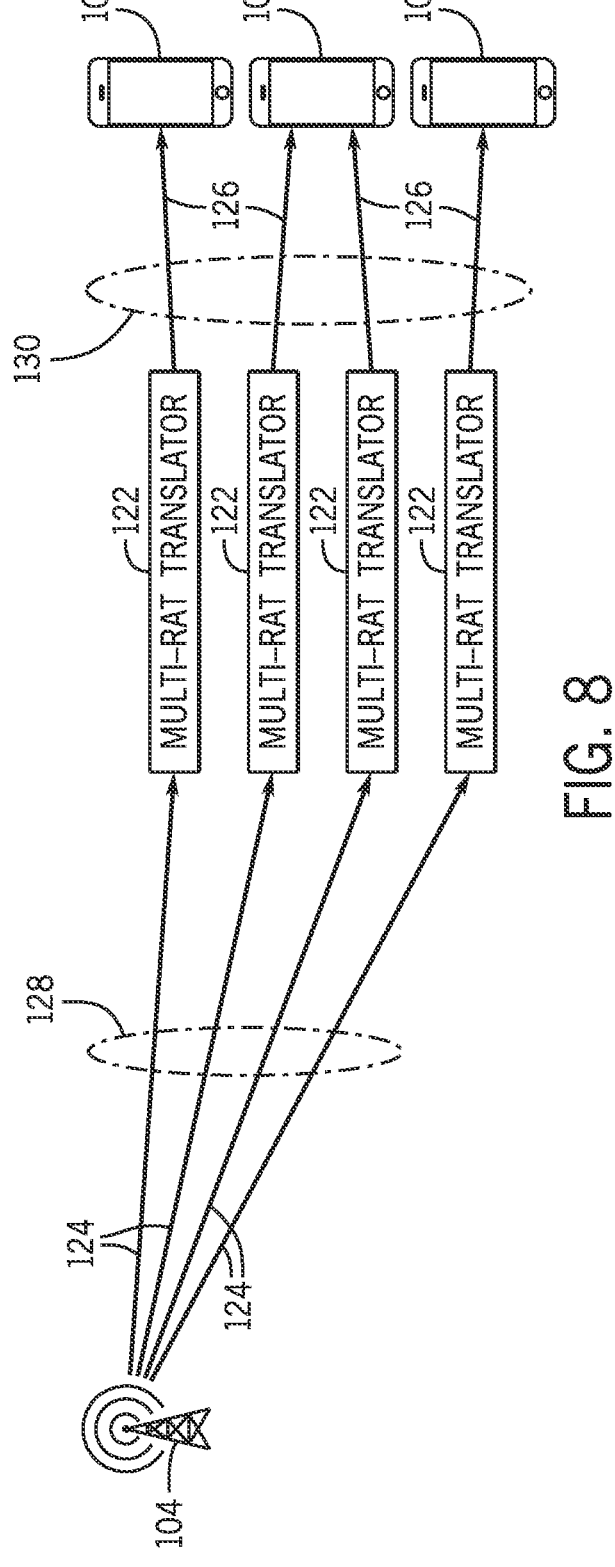
Figure 9A:
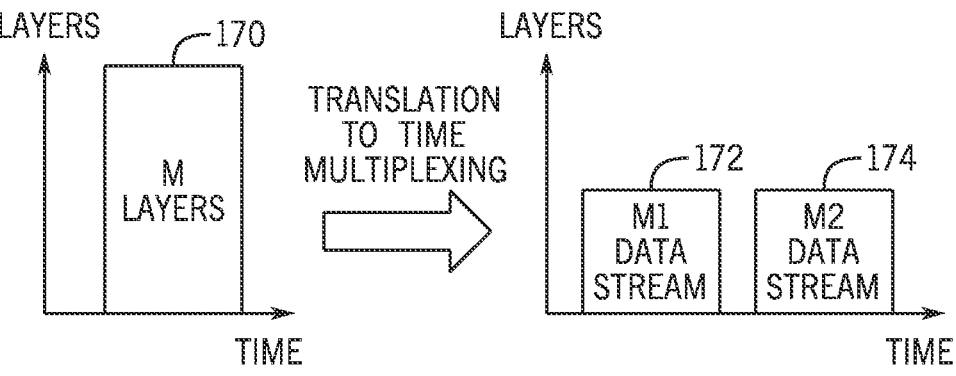
Figure 9B:
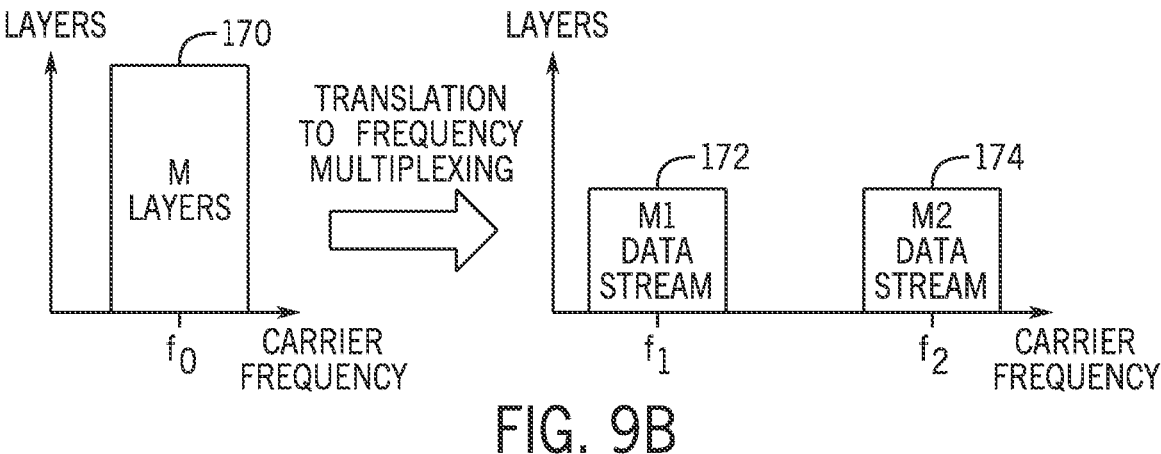
Figure 9C:
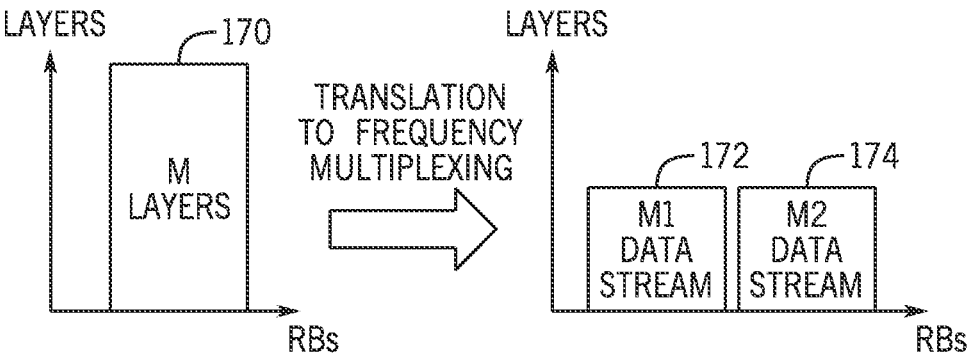
Figure 10:
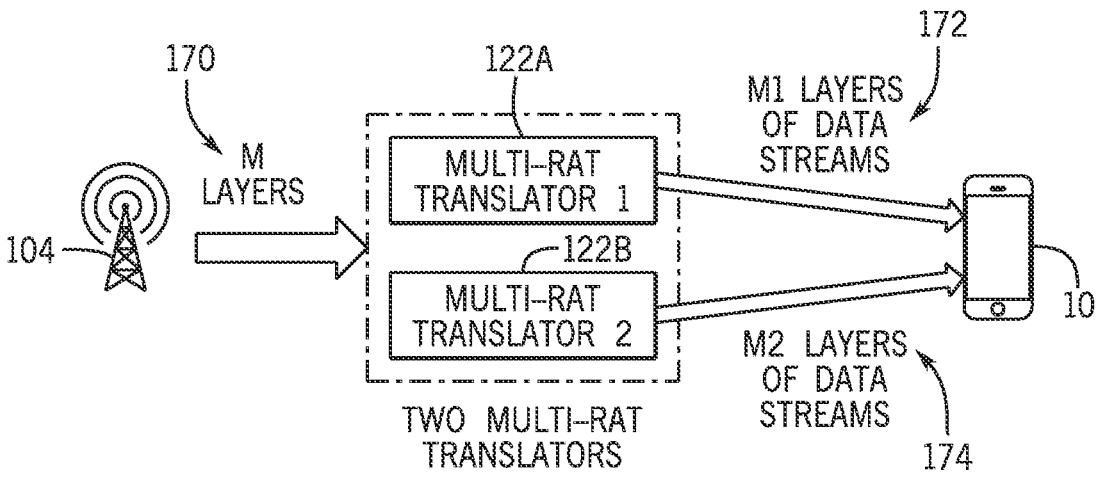
Figure 11A:
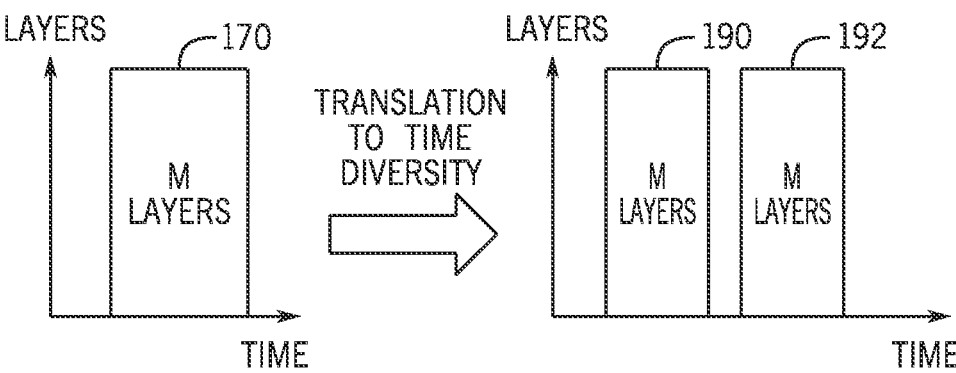
Figure 11B:
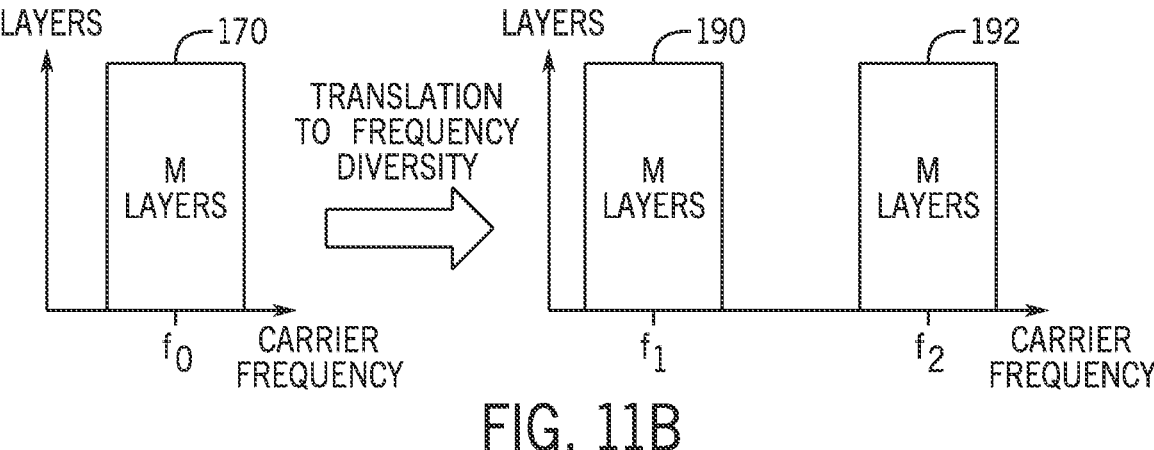
Figure 11C:
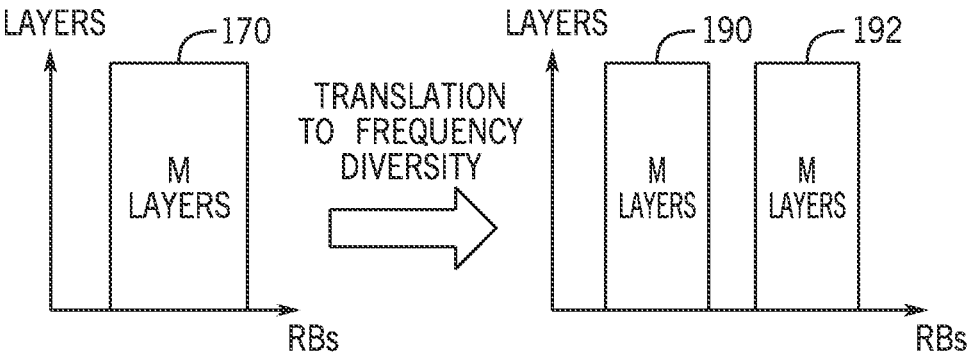
Figure 12:
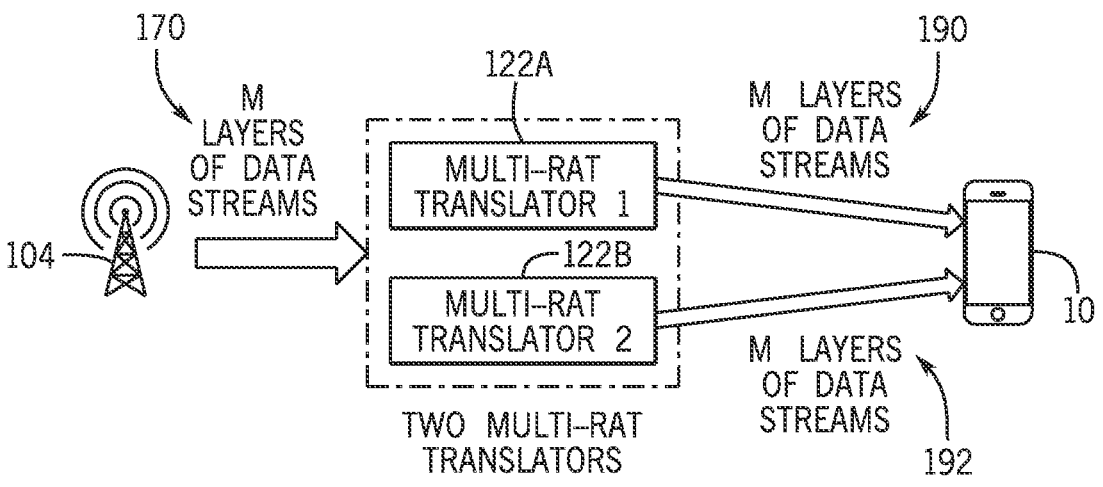
Figure 13:
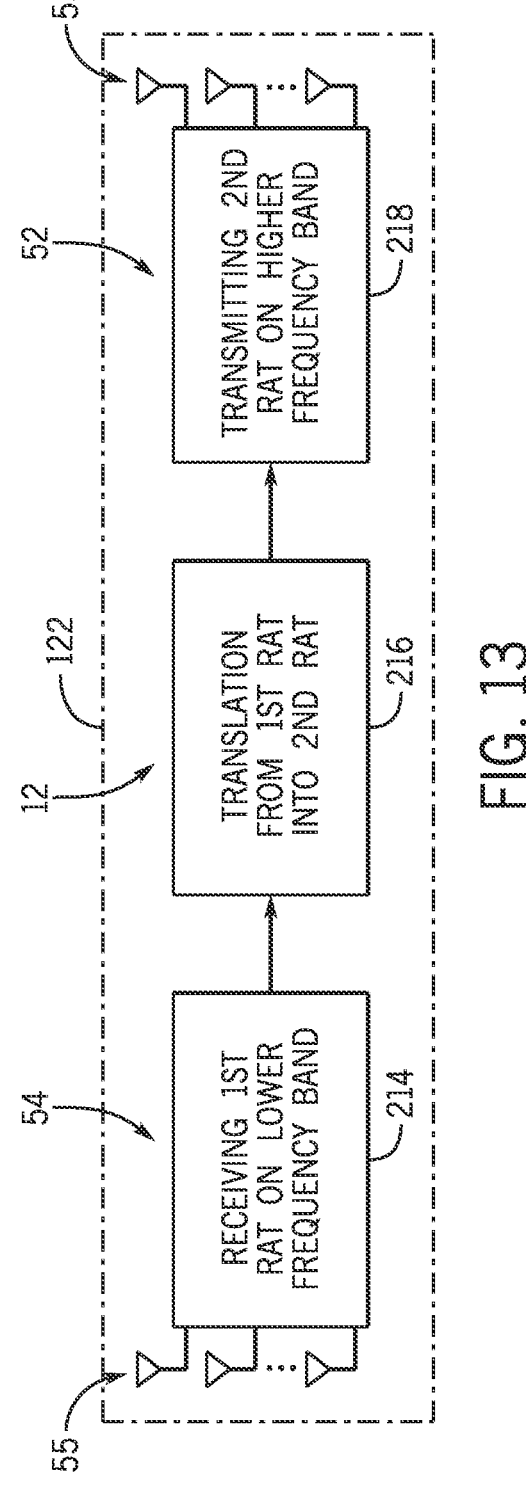
Figure 14:
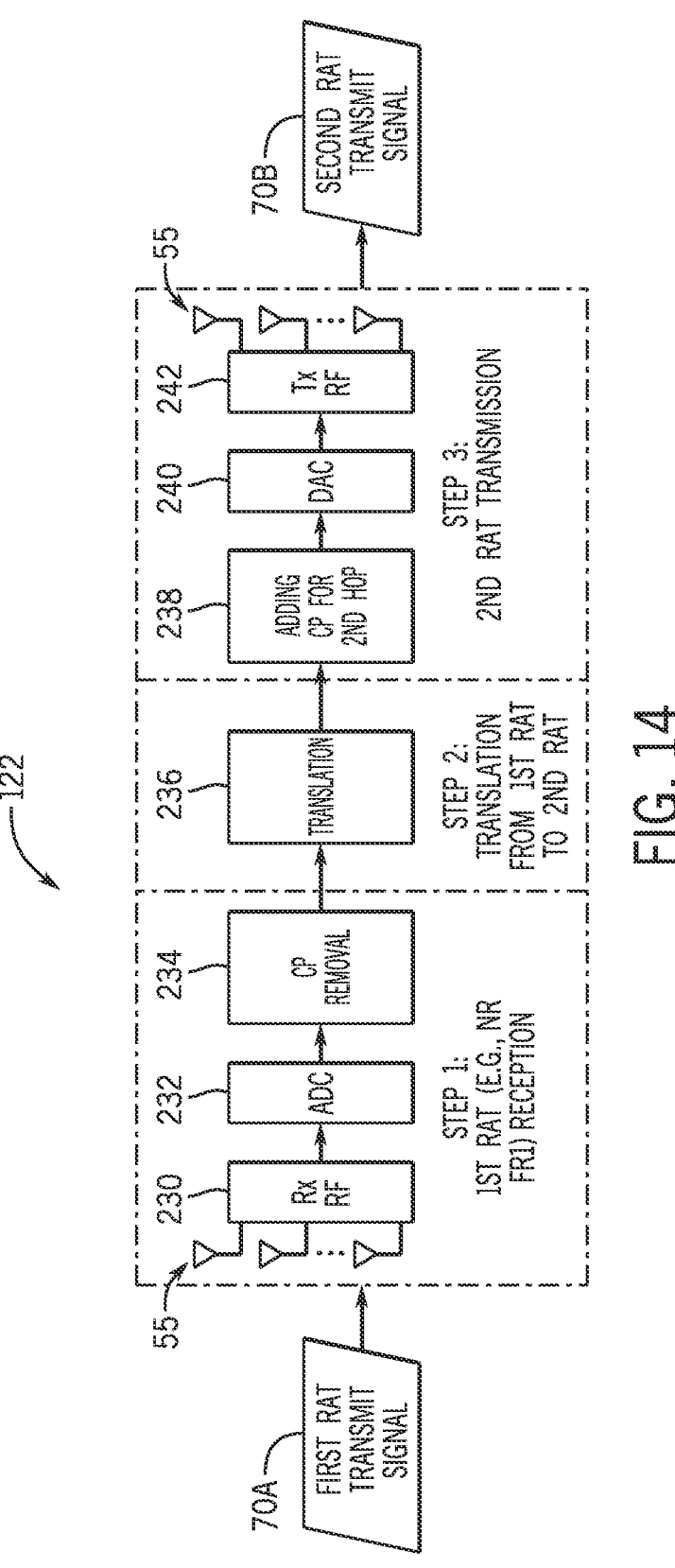
Figure 15:
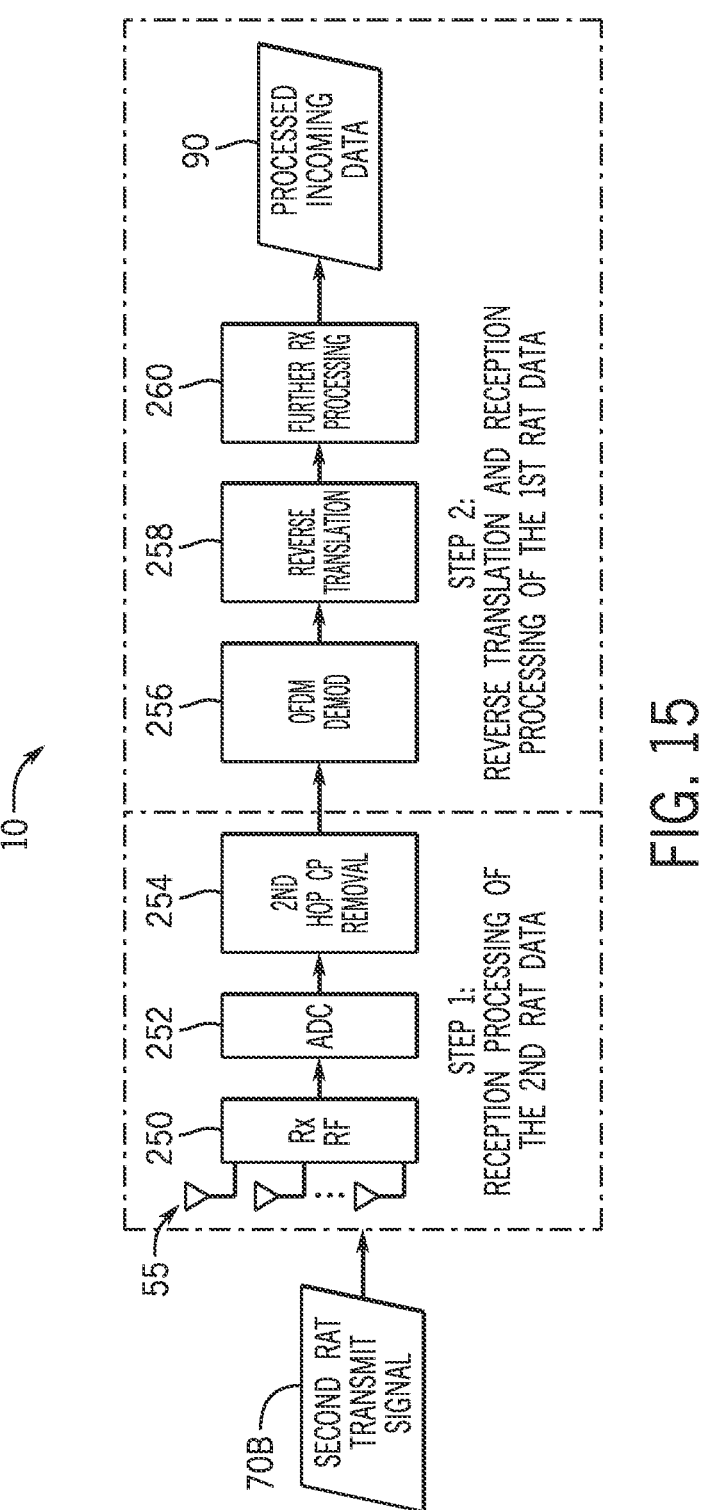
Figure 16:
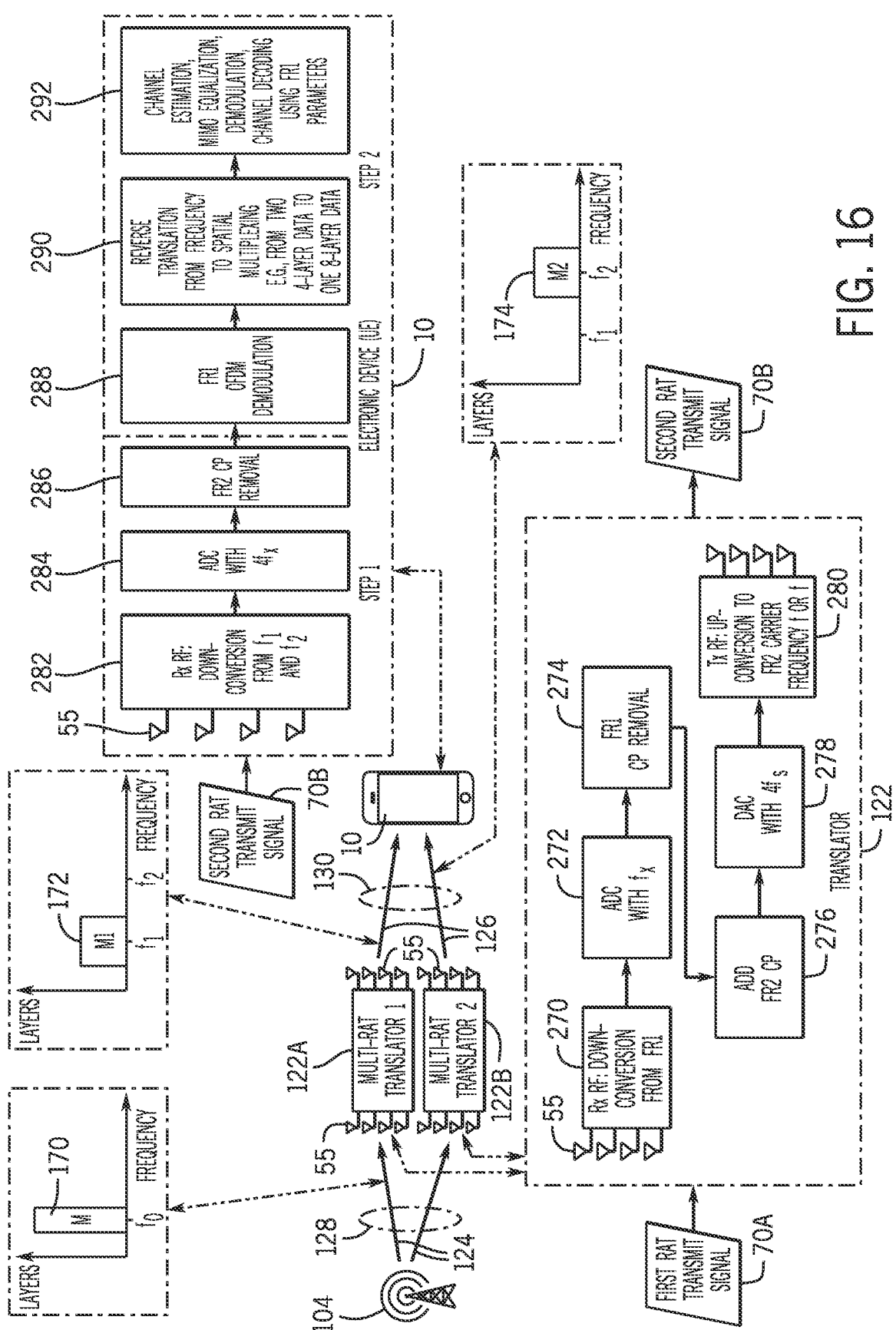
Figure 17:
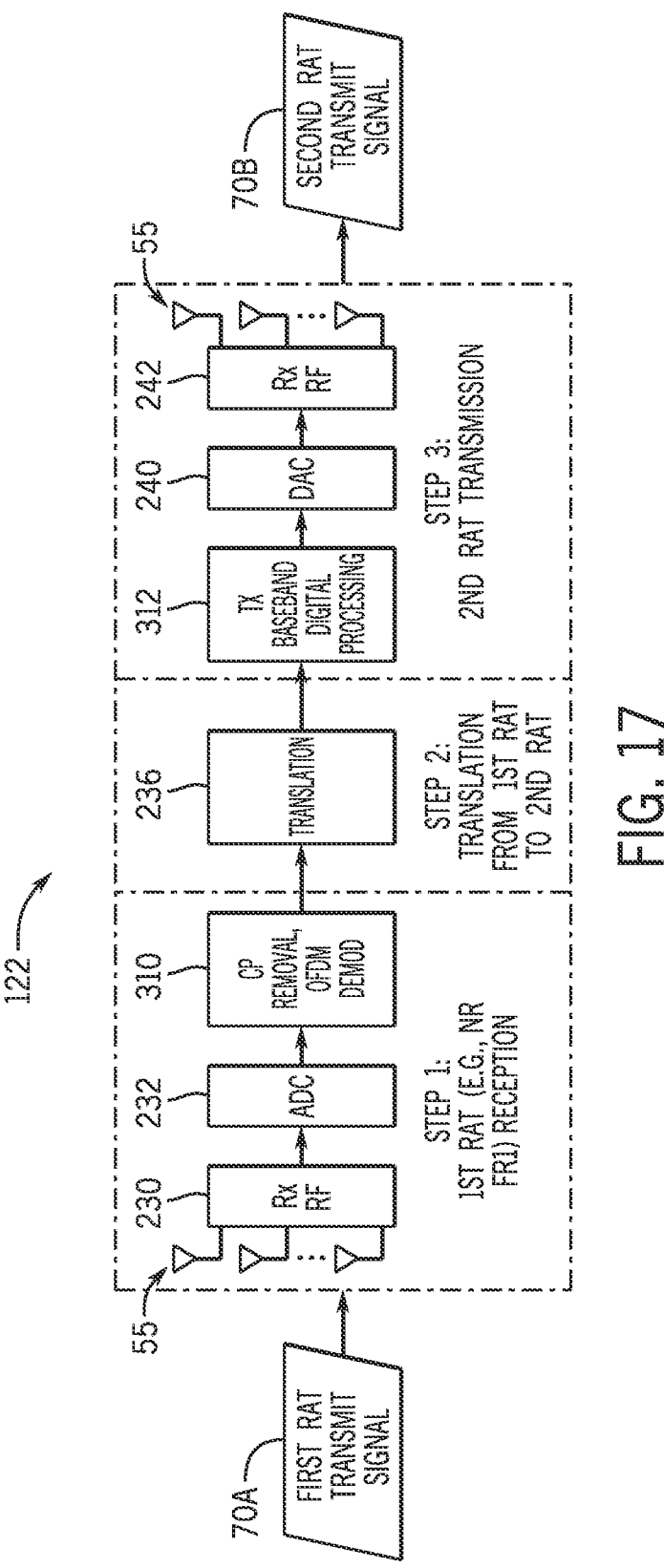
Figure 18:
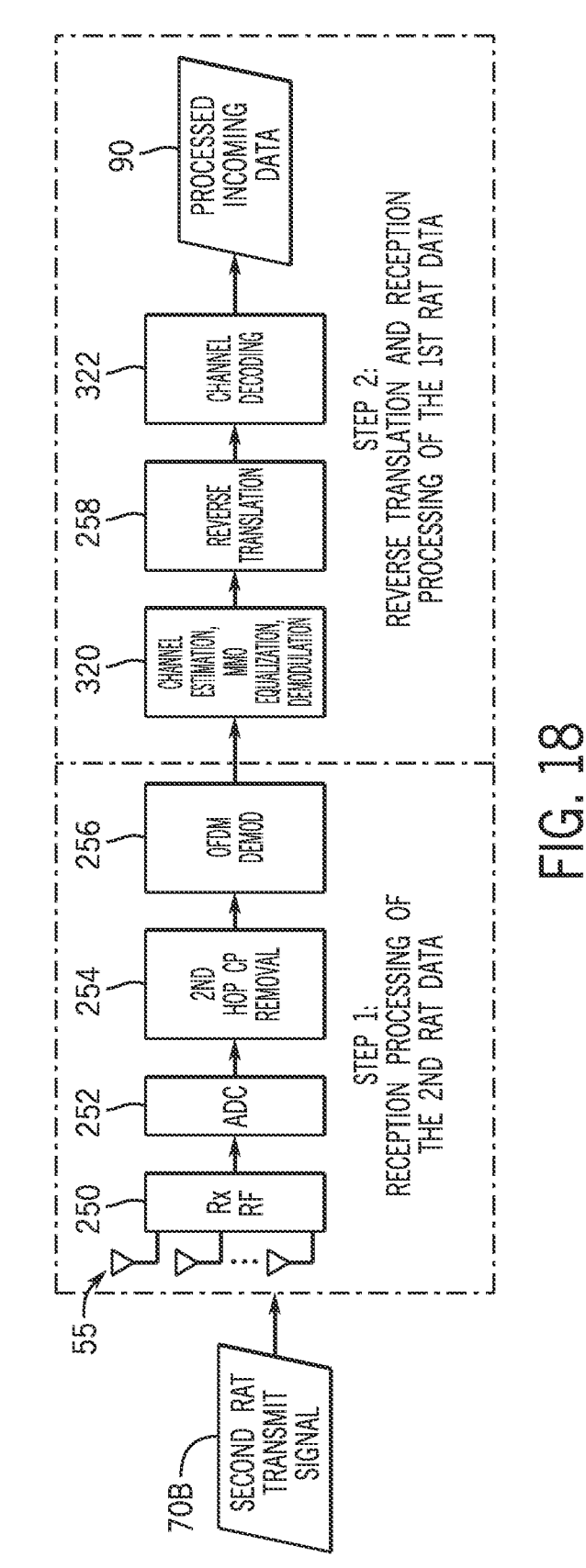
Figure 19:
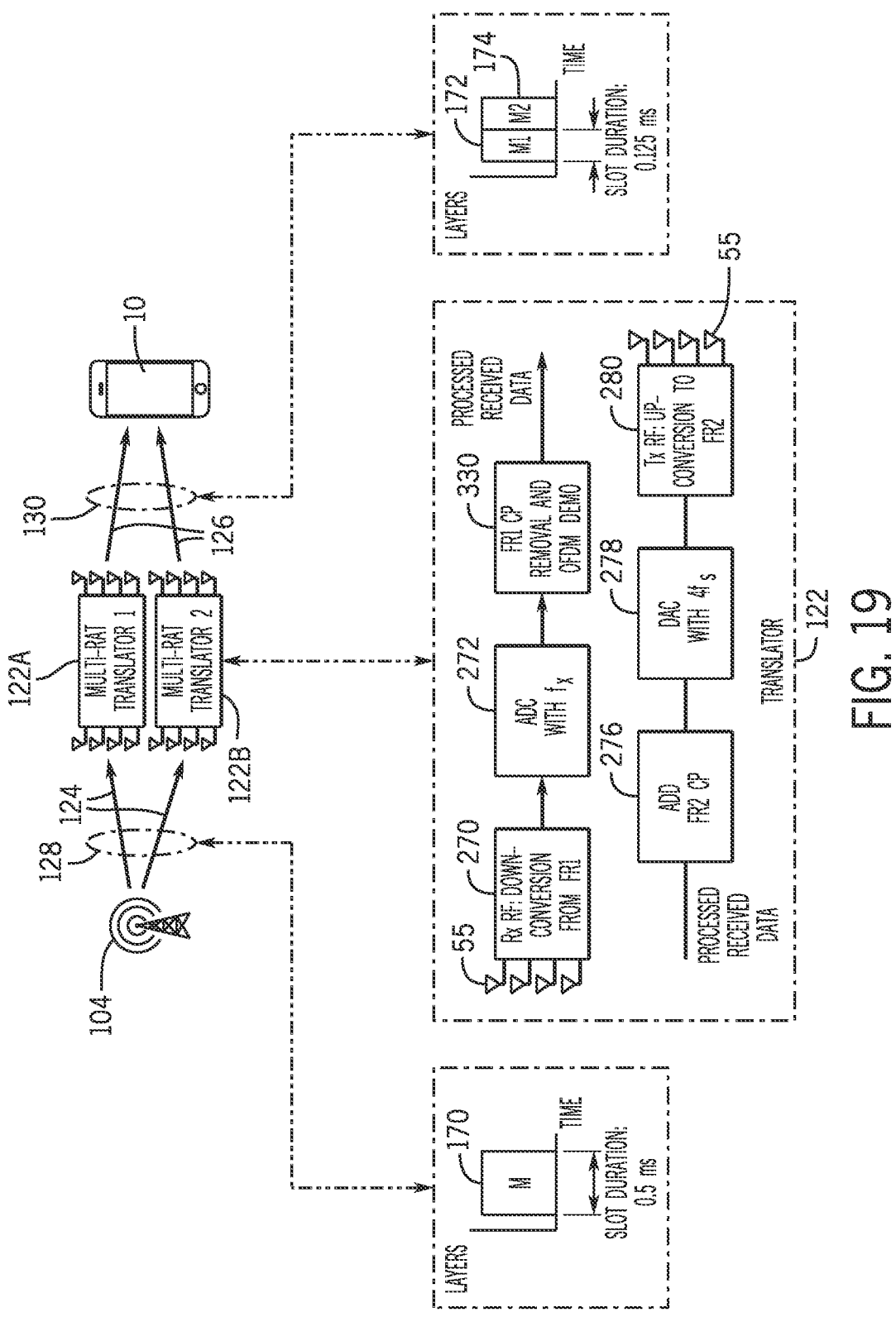
Figure 20:
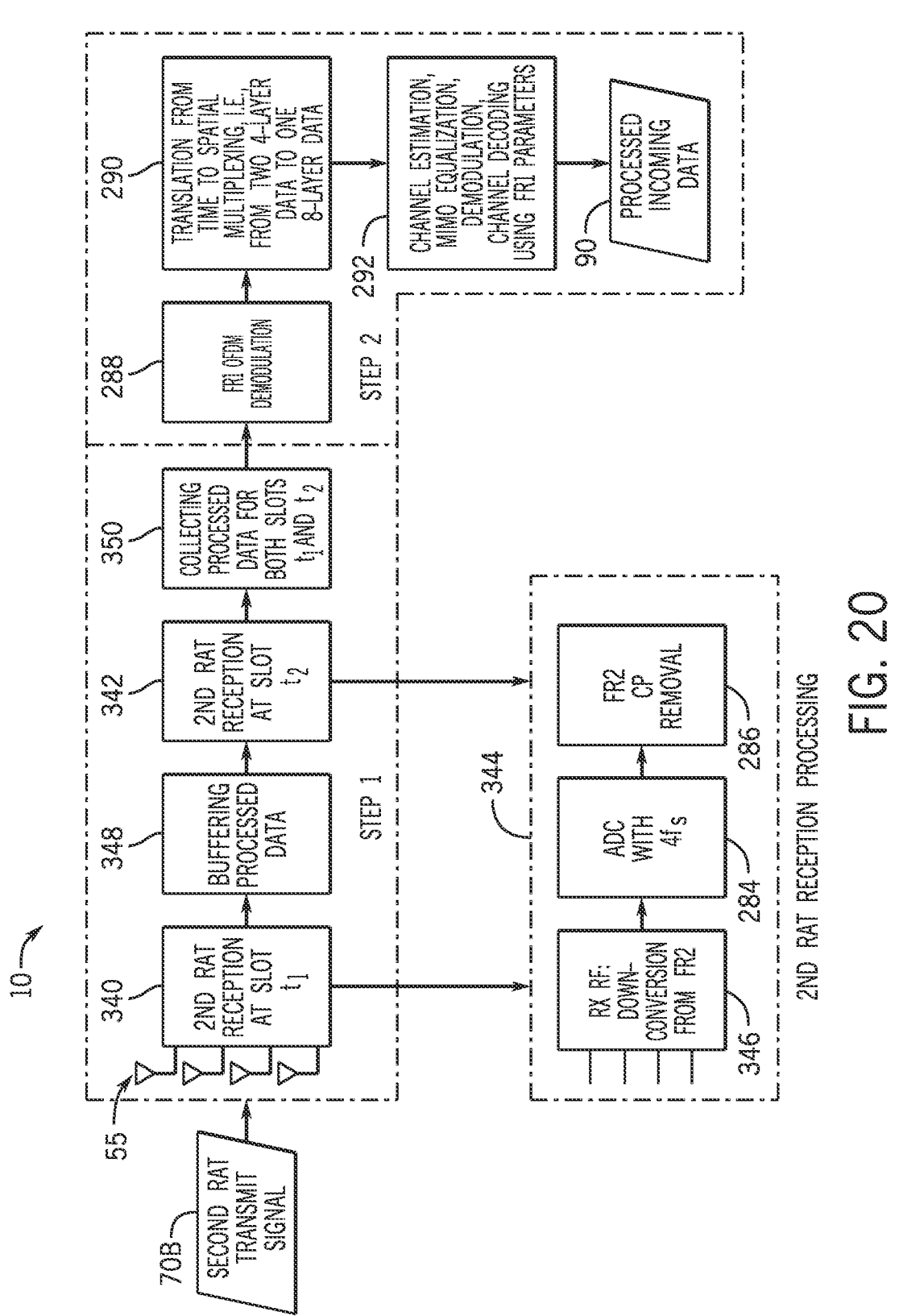
Figure 21:
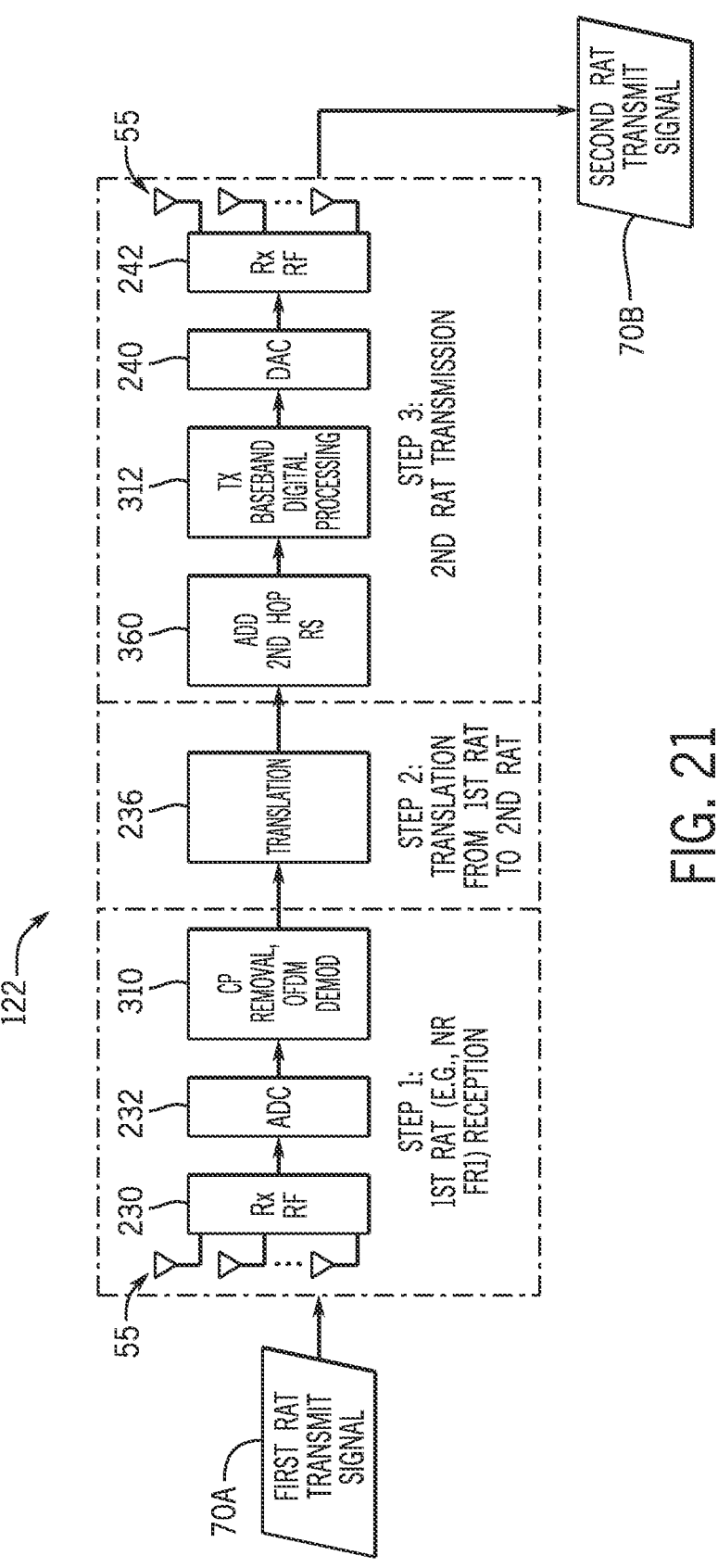
Figure 22:
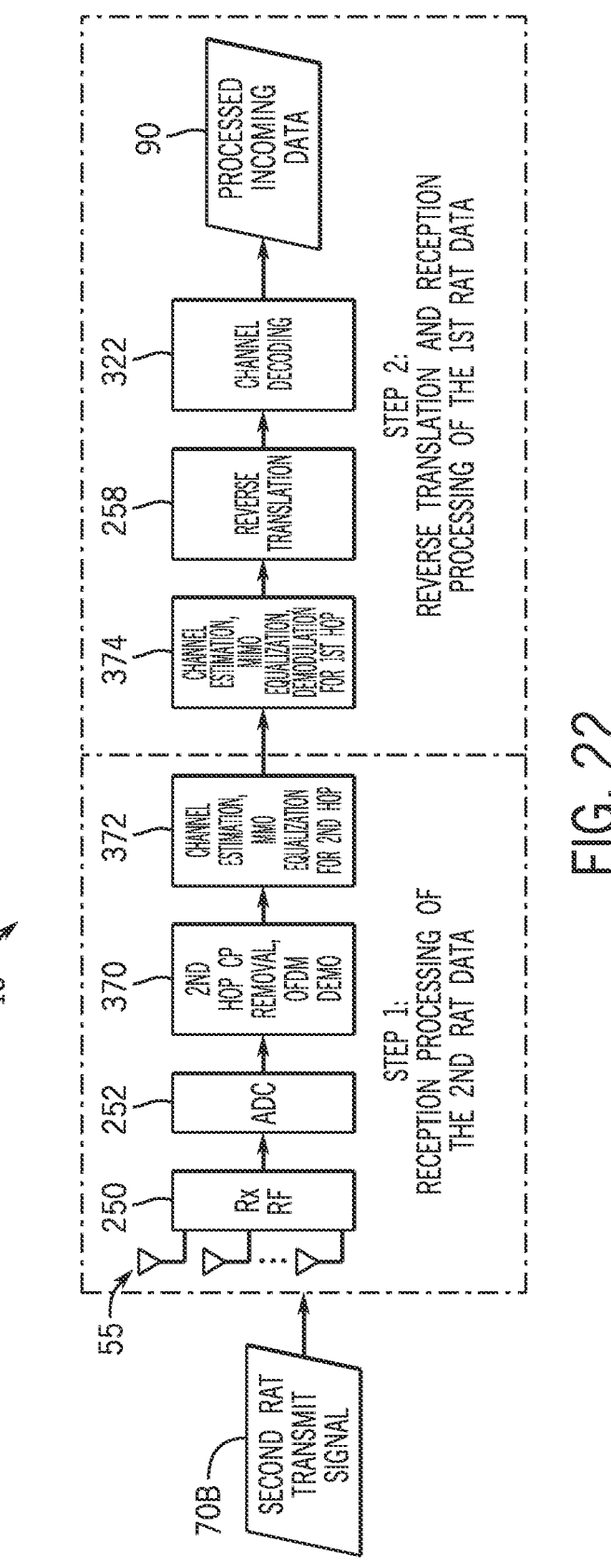
Figure 23:
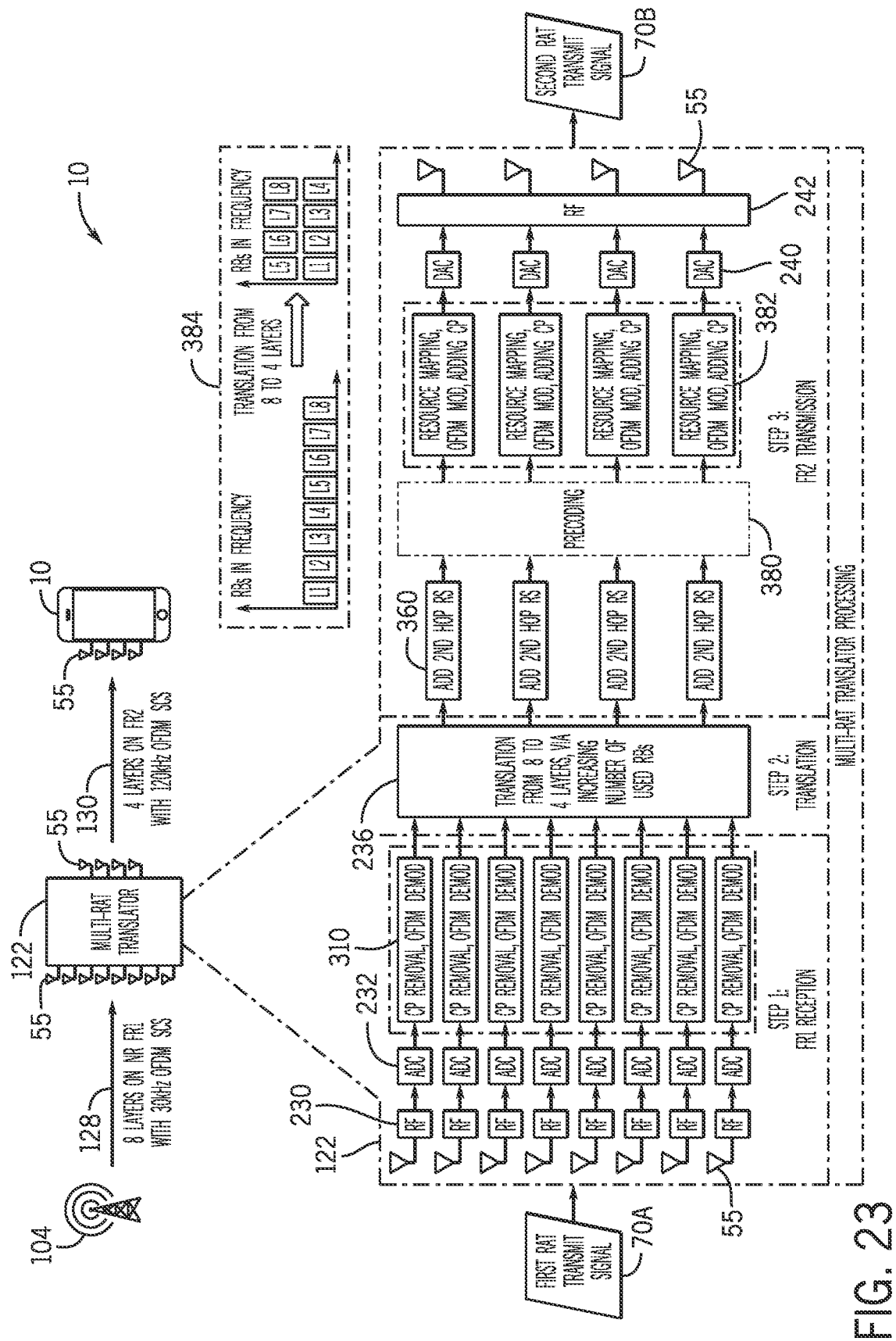
Figure 24:
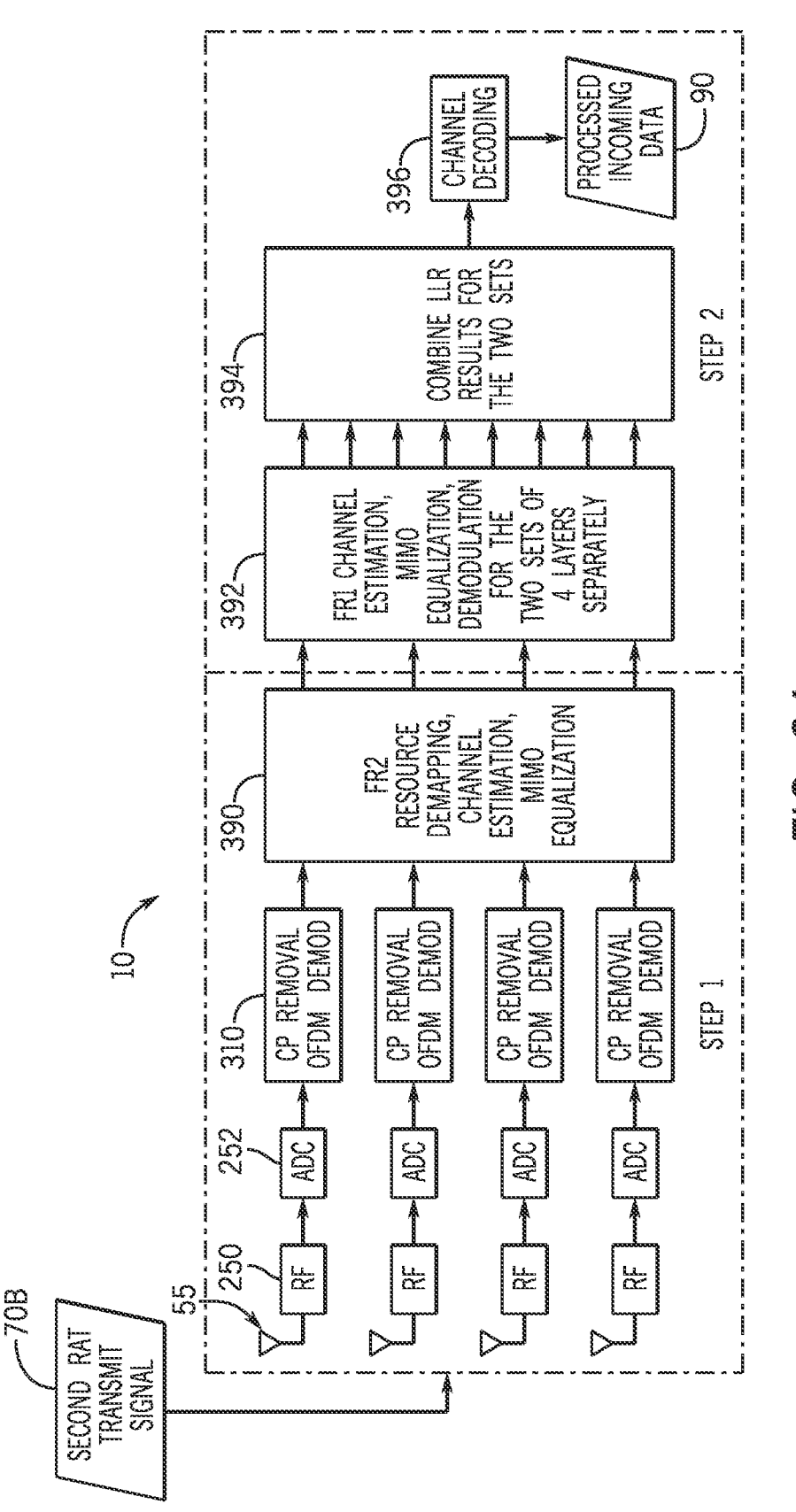
Figure 25:
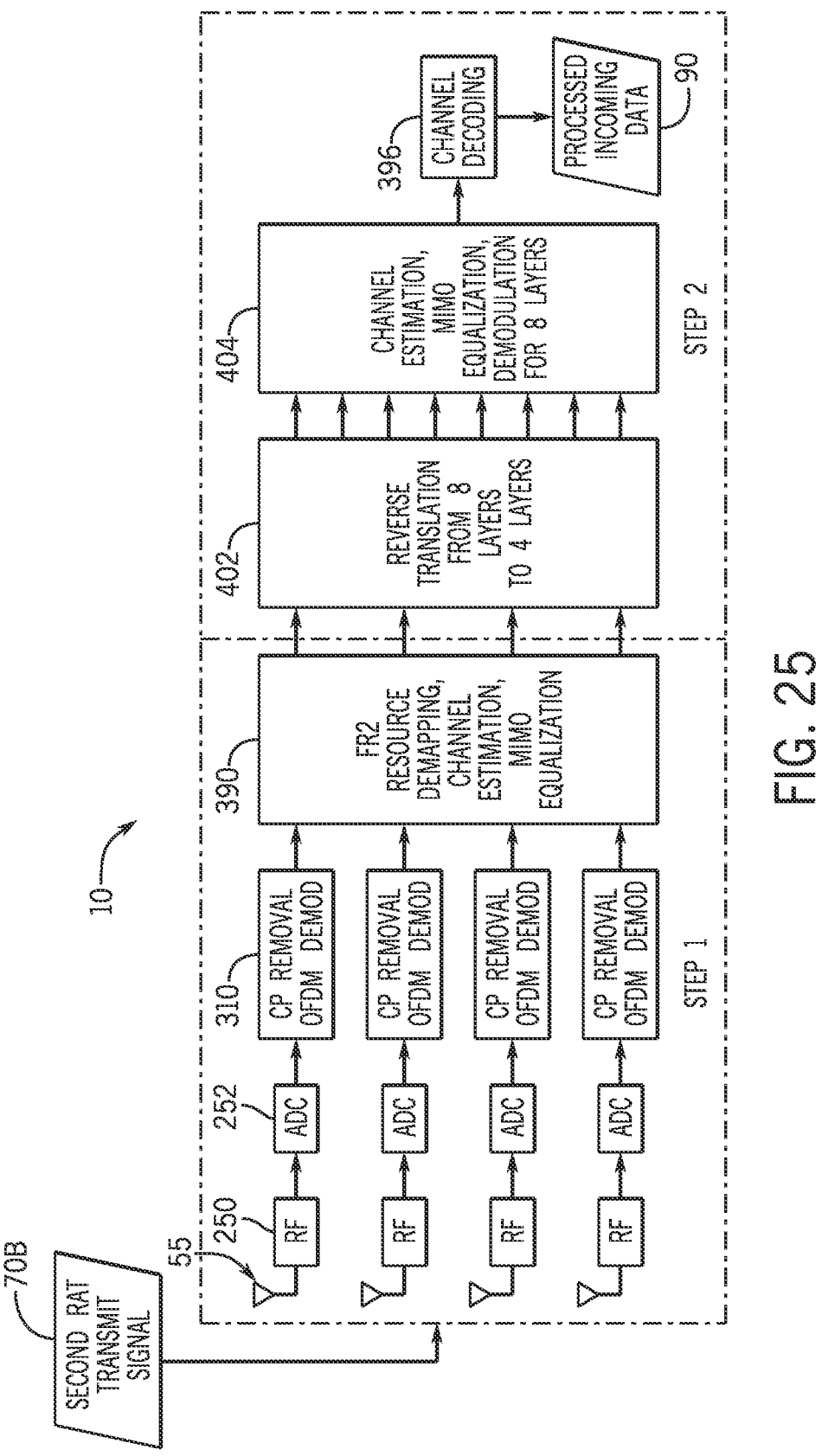
Figure 26:
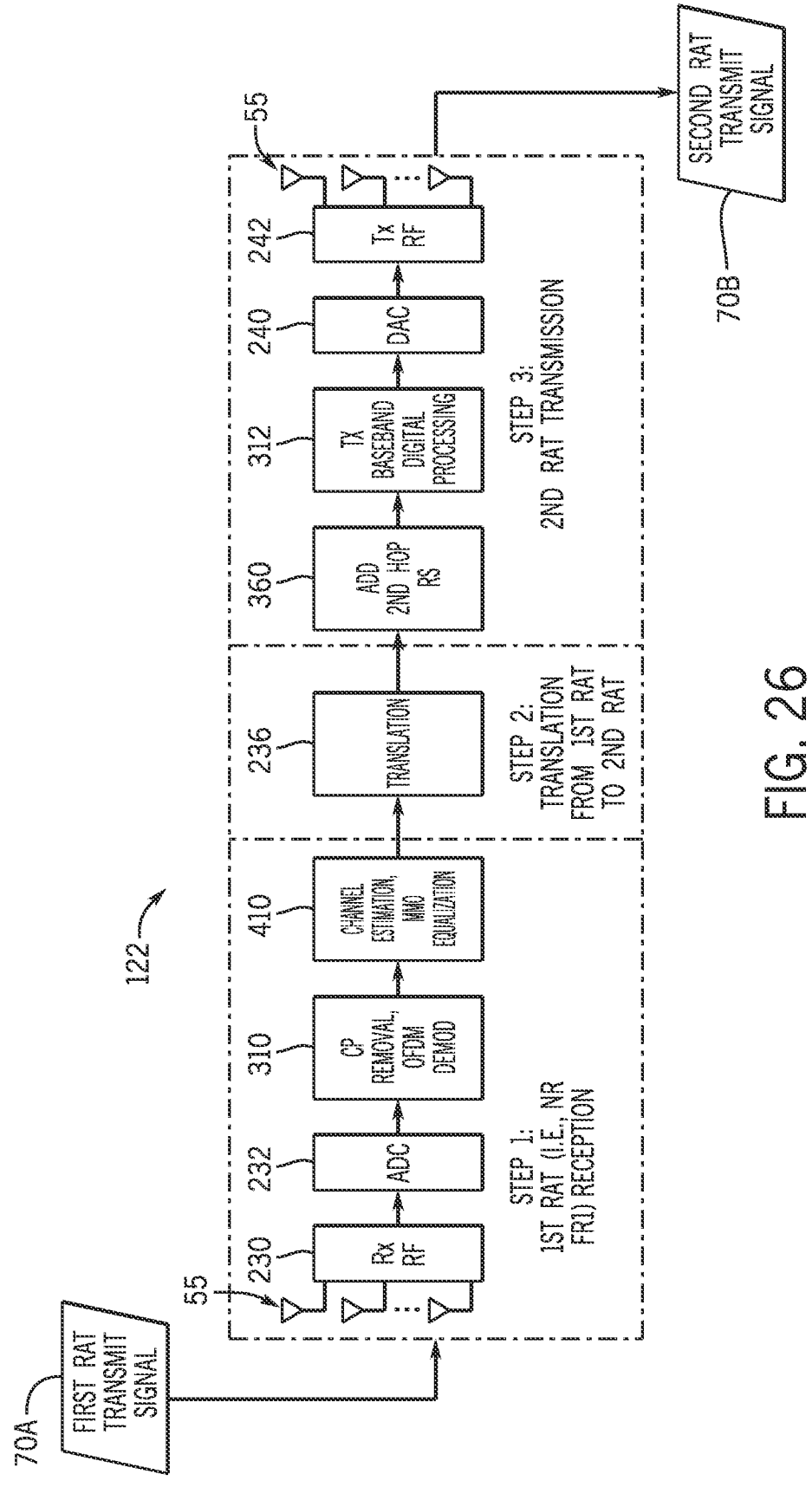
Figure 27:
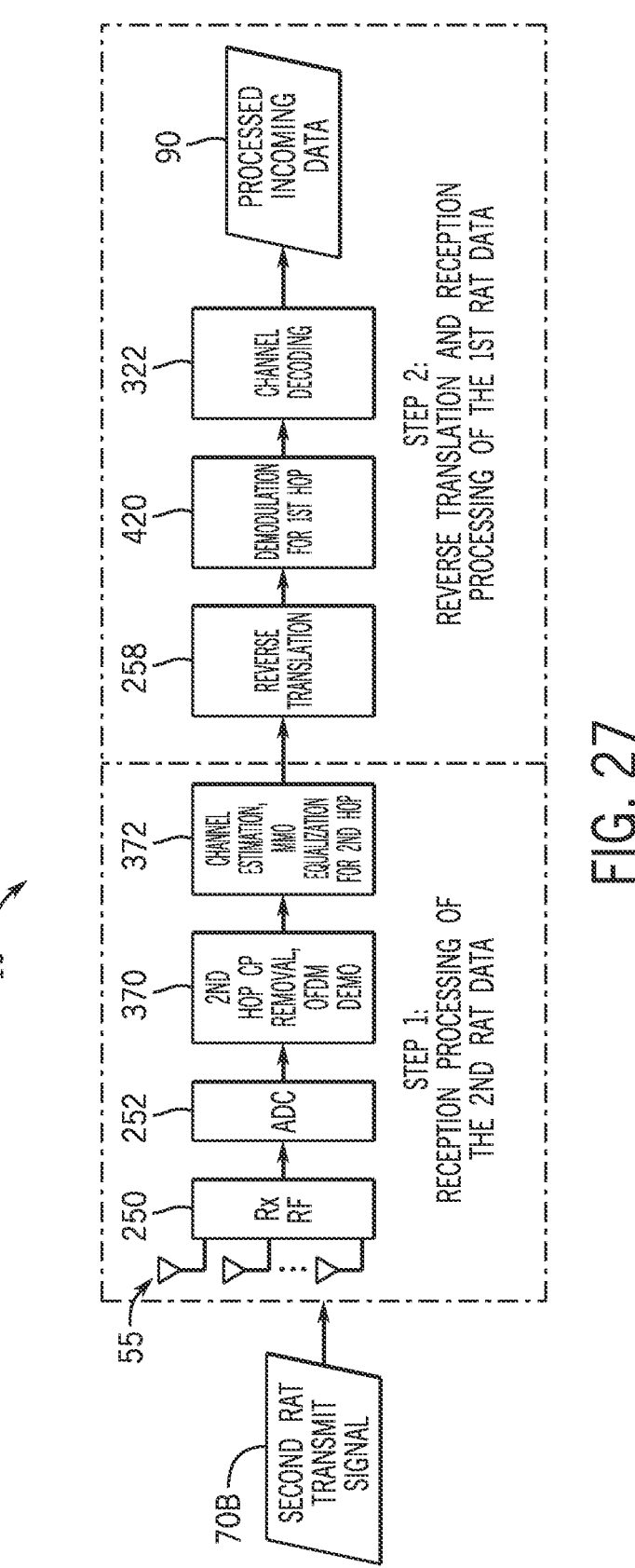
Figure 28:
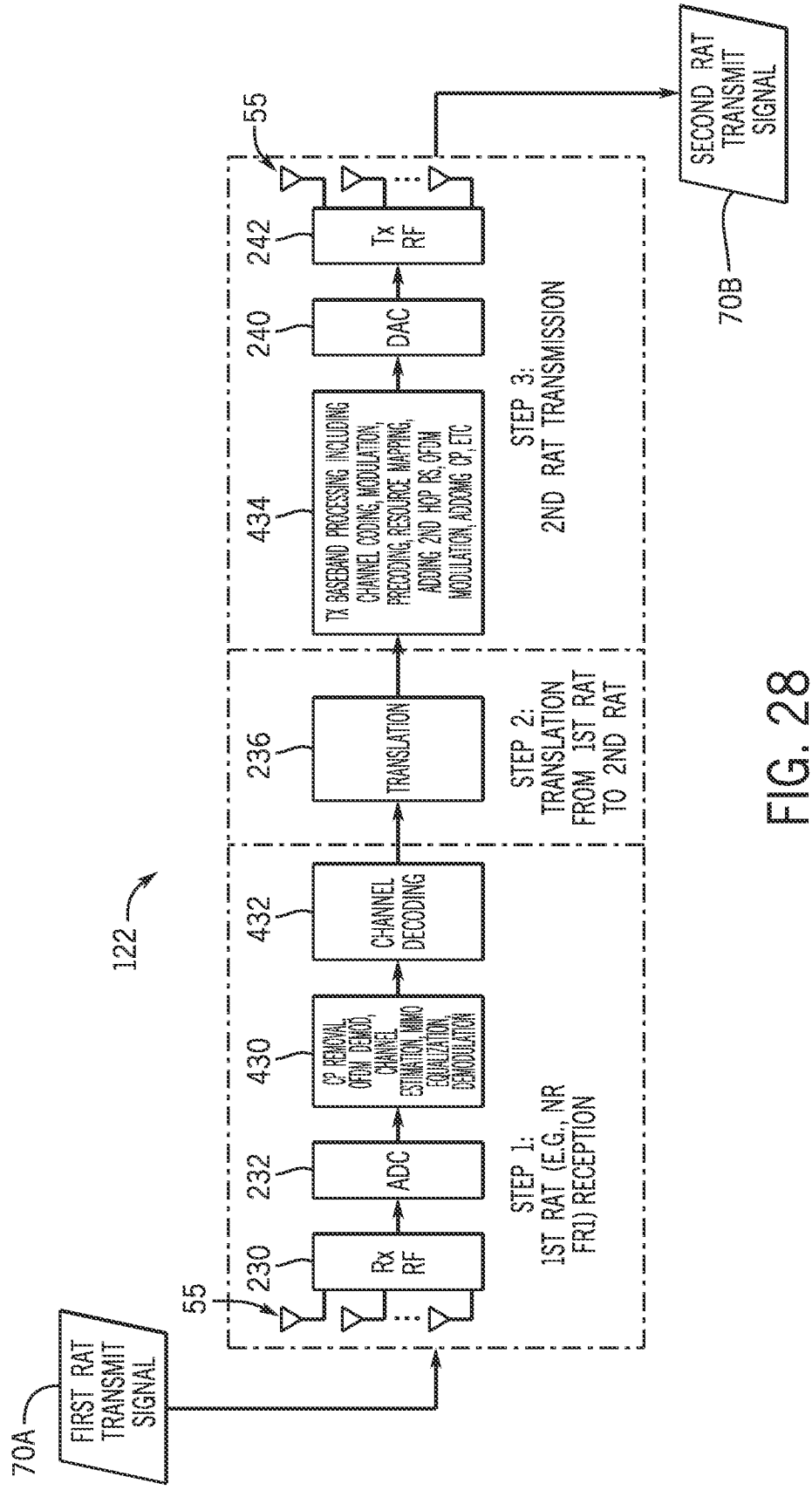
Figure 29:
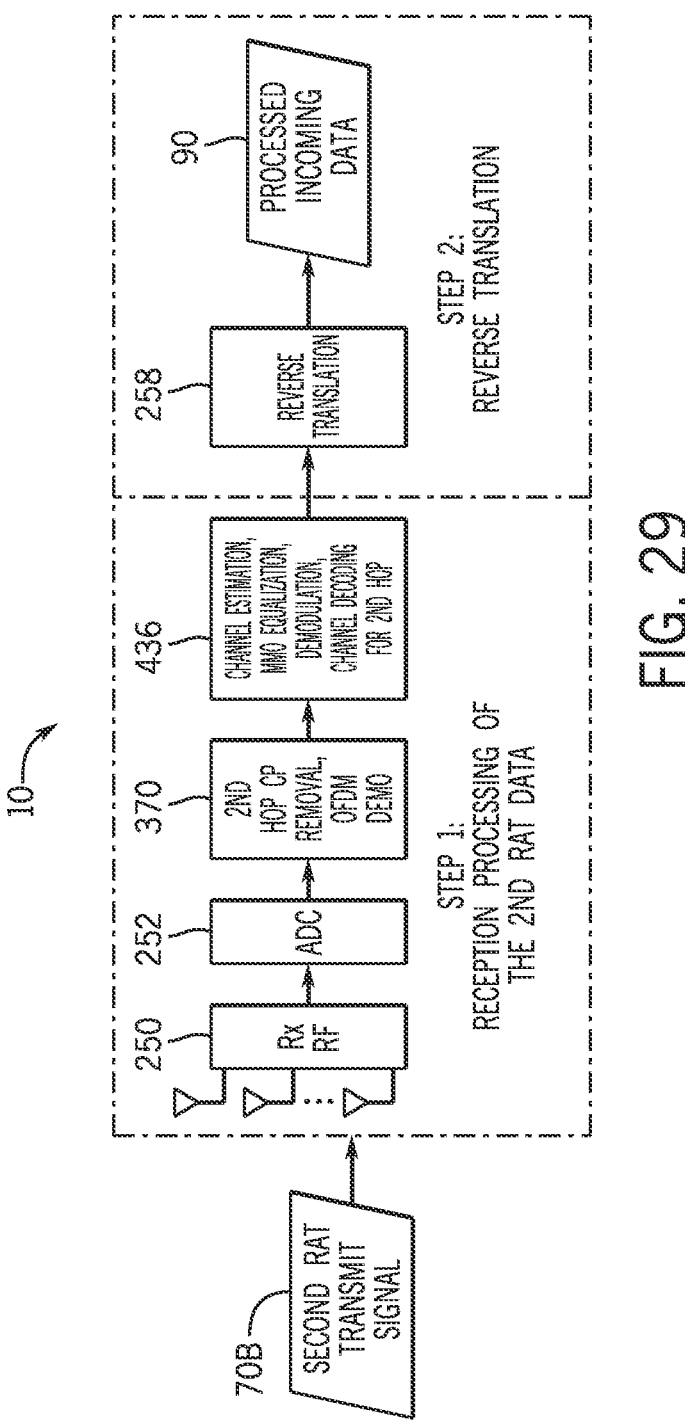
Figure 30:
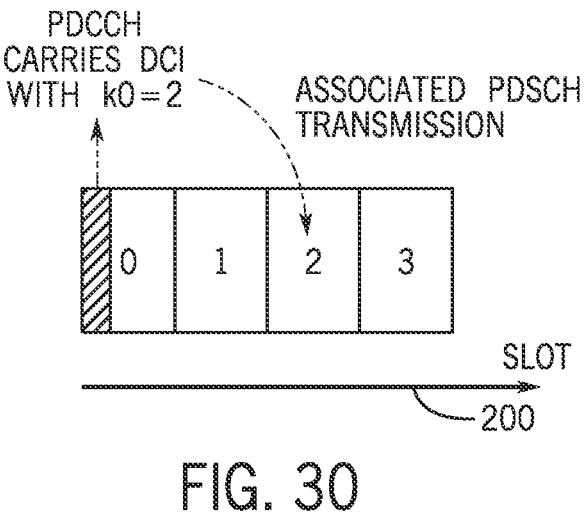
Figure 31:
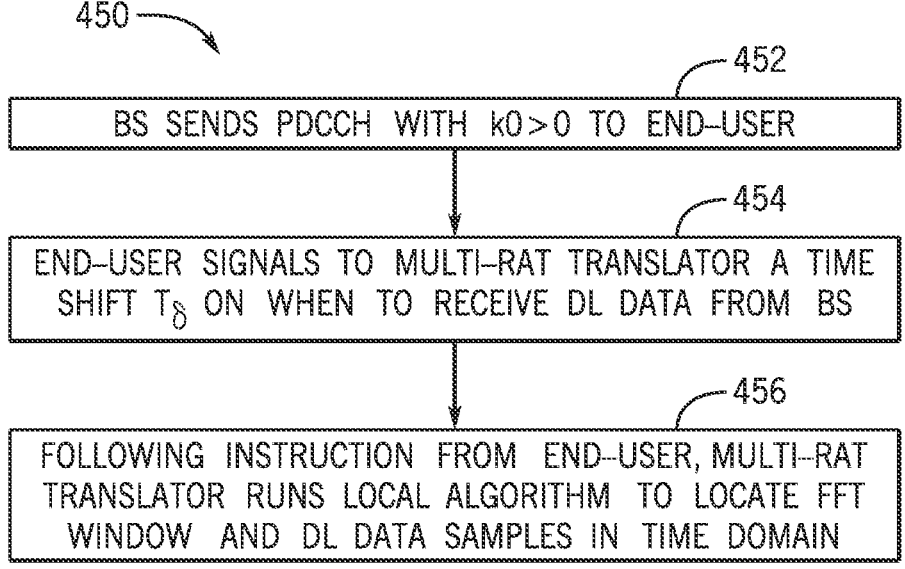
Figure 32:
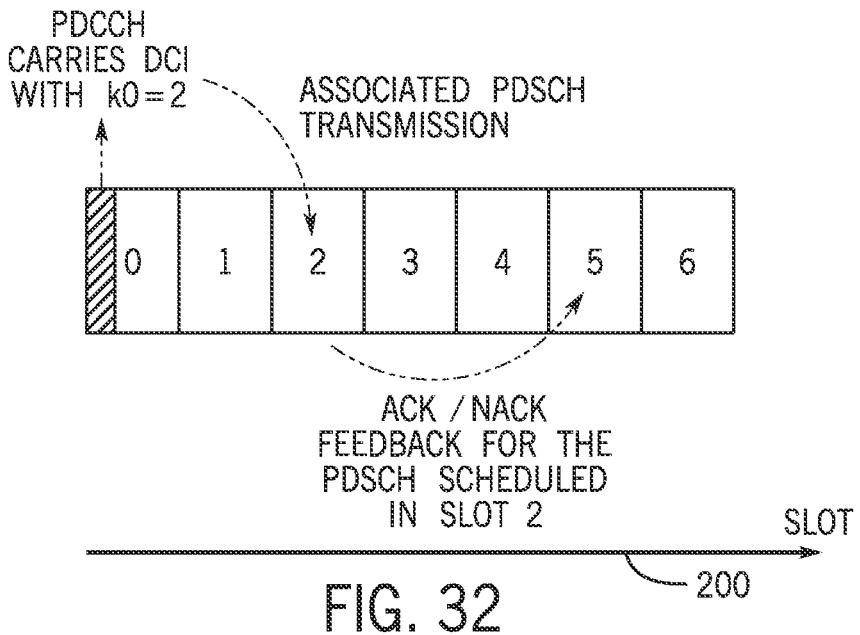
Figure 33:
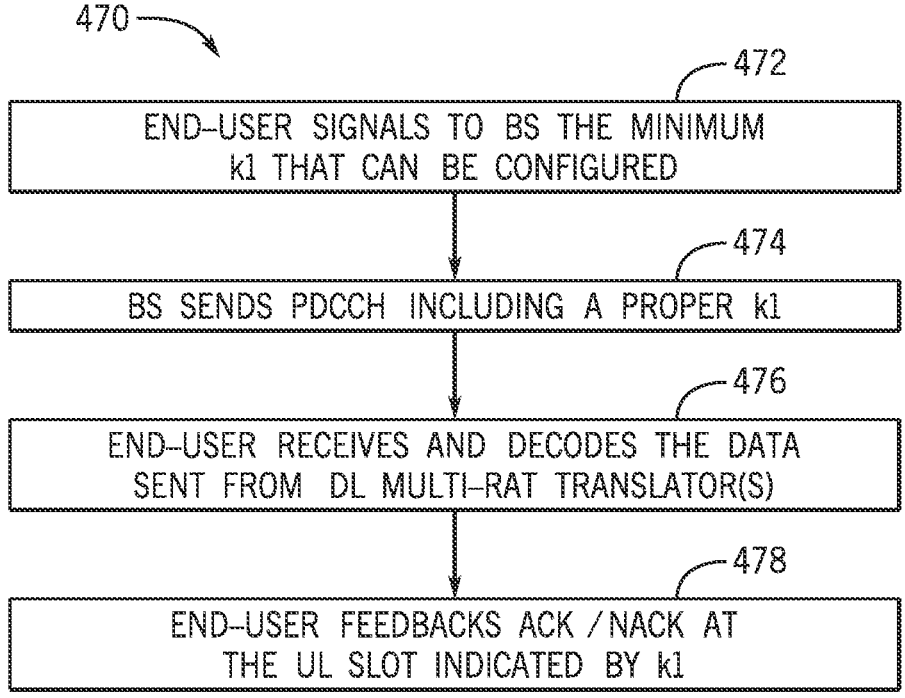

translator for the electronic device of FIG. 1, according to embodiments of the present disclosure;

FIG. 7 is a diagram of an example translation between a first RAT to a second RAT shown in FIG. 6, according to embodiments of the present disclosure;

FIG. 8 is a block diagram of the multi-RAT translators of FIG. 6 with multiple electronic devices of FIG. 1, according to embodiments of the present disclosure;

FIG. 9A-9C are timing diagrams illustrating translation from spatial multiplexing to time or frequency multiplexing, according to embodiments of the present disclosure;

FIG. 10 is a block diagram illustrating translation from spatial multiplexing of a first RAT to spatial multiplexing of a second RAT by multiple multi-RAT translators of FIG. 6, according to embodiments of the present disclosure;

FIG. 11A-11C are timing diagrams illustrating translation of a transmission to the multi-RAT translators of FIG. 6 from a single transmission into a transmission with time or frequency diversity, according to embodiments of the present disclosure;

FIG. 12 is a block diagram illustrating translation of a single transmission to spatial diversity by multiple multi-RAT translators of FIG. 6, according to embodiments of the present disclosure;

FIG. 13 is a block diagram illustrating operations of the multi-RAT translators of FIG. 6, according to embodiments of the present disclosure;

FIG. 14 is a block diagram of a first example multi-RAT translator of FIG. 6 that removes a cyclic prefix (CP) before translation, according to embodiments of the present disclosure;

FIG. 15 is a block diagram of a first example electronic device corresponding to the multi-RAT translator of FIG. 14, where the electronic device removes the CP from a transmission based on second RAT parameters from the multi-RAT translator of FIG. 14 and demodulates the transmission based on first RAT parameters after removing the CP, according to embodiments of the present disclosure;

FIG. 16 is a block diagram of a system including the multi-RAT translator of FIG. 14 and the electronic device of FIG. 15, according to embodiments of the present disclosure;

FIG. 17 is a block diagram of a second example multi-RAT translator of FIG. 6 that removes a CP and performs a demodulation before translation, according to embodiments of the present disclosure;

FIG. 18 is a block diagram of a second example electronic device corresponding to the multi-RAT translator of FIG. 17, where the electronic device removes the CP and performs a demodulation both based on second RAT parameters before performing a reverse translation based on first RAT parameters, according to embodiments of the present disclosure;

FIG. 19 is a block diagram of a system including the multi-RAT translator of FIG. 17 and the electronic device of FIG. 18, according to embodiments of the present disclosure;

FIG. 20 is a block diagram of an example electronic device corresponding to the system of FIG. 19 that receives different portions of a transmission in different time slots (e.g., time multiplexing), according to embodiments of the present disclosure;

FIG. 21 is a block diagram of a third example multi-RAT translator of FIG. 6 that removes the CP and demodulates before the translation and, after translation, adds a reference signal corresponding to the second RAT, according to embodiments of the present disclosure;

FIG. 22 is a block diagram of a third example electronic device corresponding to the multi-RAT translator of FIG. 21, where the electronic device removes the reference signal, the CP, and demodulates based on second RAT parameters before reverse translation, according to embodiments of the present disclosure;

FIG. 23 is a block diagram of a system including the multi-RAT translator of FIG. 21 and the electronic device of FIG. 22, and the multi-RAT translator of FIG. 21 has eight receiver antenna and four transmitter antennas while the electronic device of FIG. 22 has four receiver antennas, according to embodiments of the present disclosure;

FIG. 24 is a block diagram illustrating a first example of the electronic device of the system of FIG. 23, where the electronic device performs first RAT channel estimation, multiple-inputs, multiple-outputs (MIMO) equalization and demodulation for the two sets of 4-layer data separately and combines the LLR results for the two sets, according to embodiments of the present disclosure;

FIG. 25 is a block diagram illustrating a second example of the electronic device of the system of FIG. 23, where the electronic device reversely translates the two sets of 4-layer data into one set of 8-layer data and continues further processing on the 8-layer data, according to embodiments of the present disclosure;

FIG. 26 is a block diagram of a fourth example multi-RAT translator of FIG. 6 that adds channel estimation and MIMO equalization based on first RAT parameters before translation, according to embodiments of the present disclosure;

FIG. 27 is a block diagram of a fourth example electronic device corresponding to the multi-RAT translator of FIG. 26, where the electronic device performs channel estimation and MIMO equalization based on second RAT parameters before reverse translation, according to embodiments of the present disclosure;

FIG. 28 is a block diagram of a fifth example multi-RAT translator of FIG. 6 that performs channel decoding based on first RAT parameters before translation and channel encoding based on second RAT parameters after translation, according to embodiments of the present disclosure;

FIG. 29 is a block diagram of a fifth example electronic device corresponding to the multi-RAT translator of FIG. 28, where the electronic device performs channel decoding before reverse translation based on second RAT parameters, according to embodiments of the present disclosure;

FIG. 30 is a timing diagram of different timing slots associated with a Physical Downlink Shared Channel (PDSCH) scheduling over a subset of resources, according to embodiments of the present disclosure;

FIG. 31 is a flowchart of a method for a time synchronization operation that may utilize the slot configuration of FIG. 30, according to embodiments of the present disclosure;

FIG. 32 is a timing diagram of different timing slots associated with hybrid automatic repeat request (HARQ) feedback scheduling, according to embodiments of the present disclosure; and FIG. 33 is a flowchart of a method to utilize the HARQ feedback operations of FIG. 32, according to embodiments of the present disclosure.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on. Additionally, the term "set" may include one or more. That is, a set may include a unitary set of one member, but the set may also include a set of multiple members.

This disclosure is directed to communication systems that use a portion of a radio frequency spectrum of the $5^{th}$ Generation (5G)/New Radio (NR) specification and a portion of a radio frequency spectrum corresponding to sub-terahertz (THz) spectrums that may be part of a $6^{th}$ Generation (6G) specification. Current radio frequency (RF) technologies may use a $4^{th}$ Generation (4G)/Long Term Evolution (LTE) frequency spectrum and/or a $5^{th}$ Generation (5G)/New Radio (NR) frequency spectrum. However, there is an increasing desire to expand RF technologies into sub-terahertz (THz) spectrums for access to higher bandwidths. Sub-THz spectrums, such as frequencies between 100 GHz and 300 GHz (e.g., between 130-150 GHz), include a potential $6^{th}$ Generation (6G) band for high-data rate beamformed access, as well as sensing applications. With these evolutions in wireless communications, data rates expected to be used on these various networks may continue to increase relative to data rates used today. Thus, it is becoming increasing desirable to have RF systems able to communicate effectively on the higher bandwidths spectrums with stringent link budgets to meet an increasing demand. The sub-THz spectrums may have a higher frequency relative to typical 5G NR frequencies, and thus may not be natively compatible with using higher frequencies for communications. Thus, systems deployed in the current 5G spectrum (e.g., FR1 and FR2) may not be universally applicable in other spectrums used to accommodate the higher bandwidth requirements. Moreover, signals communicated using the higher frequencies may be unable to be processed by existing radio technologies deployed today without adjustment to processing operations and increasing a frequency compatibility of systems.

To elaborate further, Enhanced Mobile Broadband (eMBB) may be one use case of 5G NR and may be associated with specifications that define relatively high data rates and connectivity operating specifications. For example, International Telecommunication Union (ITU®) produces specifications that define that 5G is to achieve 9 downlink (DL) spectral efficiency (bit/second (s)/hertz (Hz)/transmission reception point (TRxP)) and 7.8 bit/s/Hz/TRxP average DL spectral efficiency for indoor and urban scenarios respectively. However, with current technology, it may be difficult to reach such spectral efficiency (e.g., data rates) and may be even more difficult in cases like cell-edge use cases and indoor use cases where communication network characteristics may less than ideal. For example, a length of time that a signal is in flight and/or a signal transmitting through solid walls of a building may increase a likelihood of distortions, which may decrease a quality of signal at an edge of a network cell. Some studies (e.g., a Third Generation Partnership Project (3GPP) R17 coverage enhancement study of TR38.830 specification) may target a 10 megabits-per-second (Mbps) DL data rate for FR1 urban scenario with an inter-site-distance (ISD) of 500 meters (m) and 25 Mbps DL data rate for 1-R2 urban scenario with an ISD of 200 m. This target implies that the currently achieved 5G data rates are still lower than these values. Compared to FR1, FR2 may have the characteristics of potentially wider channel bandwidth (e.g., 400 MHz for FR2 vs 100 MHz for 1-R1) while also having more severe propagation conditions.

One of the main reasons of the low data rate of current 5G NR implementations is the high outdoor-to-indoor (O2I) penetration loss, especially for high frequency bands. According to TR38.901, the O2I penetration loss may be as high as 33 decibels (dB) and 43 dB for 4 GHz and 28 GHz frequencies, respectively. The actual penetration loss in real world may be even higher depending the building material that the signals are to conduct through. The high O2I penetration loss makes the data rate requirements harder to meet for indoor use cases.

To improve the performance of cell-edge use cases and indoor use cases, two systems have been proposed: network densification systems and relay-based systems.

In network densification systems, small cells may be deployed at higher frequency bands, which may, to some extent, improve system capacity and connectivity. However, with increased frequencies, the number of small cells actually getting deployed in a network increases. Therefore, this system may be expensive and relatively difficult to scale. Furthermore, in a scenario of dense and/or small cells, the inter-cell interference may reduce overall system performance.

In relay-based systems, there may be two example approaches: amplify-and-forward (AF) relay and decode-and-forward (DF) relay. An AF relay may include a repeater; while a DF relay may include a regenerative relay, which brings performance robustness at the cost of increased complexity. Using the DF relay would require channel encoding and decoding while having improved performance relative to the AF relay. Moreover, both relay categories may consider that the communications between base stations (e.g., network access nodes) and relays, as well as between a relay and a user equipment, are in the same frequency (e.g., FR1, FR2). FR1-based relays may achieve relatively good network coverage while not overall meeting desired data rates due to the limited bandwidth. On the other hand, despite the large available spectrum, FR2-based relays may suffer from severe propagation conditions and penetration losses, which may contribute to poor network coverages experienced by user equipment.

When it comes to the achievable data rate of a single user, 5G NR standards may support up to a particular number of downlink (DL) layers per user equipment (UE), for example up to 8 DL layers per UE. Each downlink layer may correspond to a receiving (RX) antenna at the UE. These RX antenna specifications may represent a design constraint when a UE is outfitted with a relatively small number of RX antennas (e.g., a UE may have 4 RX antennas but should have 8 RX antennas to comply with the 5G NR standards or be compatible with 5G NR systems). The smaller number of antennas may be due to a limited device size (e.g., some UE designs may be challenging to deploy more antennas). Hence, a supported number of transmission layers per UE may be constrained by the UE rather than network-side circuitry, like a base station (BS).

Building upon 5G, the forthcoming 6G is expected to continue to evolve to support more demanding use cases, such as augmented reality and holographic communication operations, and thus the required data rate is expected to be even higher. In addition to the 5G spectrum (e.g., FR1 and FR2), 6G may expand to sub-THz bands (e.g., frequencies between 100 GHz and 300 GHz, frequencies between 100 GHz and 1000 GHz). Compared to FR2, sub-THz bands may have access to a larger spectrum while being more constrained on its link budget. Thus, it may be desirable to efficiently utilize higher frequency bands (e.g., FR2 or sub-THz) with a proper design that realizes the actual benefits of higher frequency band.

With this in mind, systems and methods discussed herein may enable a 5G RF system to use both 5G NR spectrums and a 6G/sub-THz spectrum, even when faced with cell-edge conditions and/or indoor use cases. These systems and methods discussed herein relate to an architecture that enables a sub-THz signal to be down-converted to a lower frequency before further processing by the communication network (e.g., base stations, other network nodes). The lower frequency may be a frequency that is less than the sub-THz frequency ranges but greater than a baseband frequency associated with the communication network, where a baseband frequency is a used to modulate a carrier signal to communicate data. The conversion operations may be performed by a multi-RAT translator. The architecture described herein may use FR1 frequencies (e.g., between 0.41 GHz and 7.125 GHz, between 4 GHz and 8 GHz, between 4.1 GHz and 7.125 GHz) as the lower frequency along with slot-level coordination with the 5G spectrum. In some cases, a channel raster of the sub-THz spectrum used may be substantially equal to 140 GHz having a 10 GHz bandwidth. The architecture described herein may also use 1-R2 frequencies (e.g., between 24.25 and 52.6 gigahertz (GHz), between 27 GHz and 40 GHz, between 27 GHz and 29 GHz, between 24.25 GHz and 52.6 GHz, between 27.5 GHZ and 28.5 GHz, 38.5 GHz and 39.5 GHz), such as when the user equipment implements a heterodyne architecture that processes both 6G sub-THz spectrum signals and 5G NR FR2 spectrum signals.

By using the architecture systems and methods described herein, higher data bandwidths may be realized by existing systems and methods. This yields the further advantage of circuitry not having to be redesigned and manufactured to access the higher frequencies, which may reduce deployment costs and timeframes associated with utilizing a high bandwidth, sub-THz RF communication system to market. Indeed, existing FR2 silicon may be leveraged, which may reduce an overall complexity of a sub-THz accessing system and rendering the application of such technology to mobile devices attractive.

To elaborate further, this disclosure covers implementation details related to 5G NR and 6G dual-communication systems, such as 5G NR and 6G UE heterodyne architectures. Several embodiments relative to multiple radio access technologies (RAT) translator device (multi-RAT translator) are discussed. The multi-RAT translator may couple between network-side devices and UE devices to translate between lower frequency bands (e.g., FR1 or other 5G bands) and higher frequency bands (e.g., FR2 and/or 6G/sub-THz bands). Multi-RAT translators may be network-agnostic systems, such as a microcell, deployed to facilitate communications between UE devices and communication networks. A landlord, building operator, or otherwise operational group may install a multi-RAT translator to locally facilitate the interfacing between two different networks (e.g., 5G-to-6G communications), and the multi-RAT translator may be thought of as a radio extension unit of the UE device. However, in some embodiments, the multi-RAT translators could be deployed by a radio network operator (e.g., be extended to network control over time). In either case, the multi-RAT translator may be deployed and communicate with the UE device without a SIM card.

One embodiment may include a multi-RAT assisted downlink (DL) transmission that operates based on frequency multiplexing and/or spatial multiplexing. Frequency multiplexing is a process by which a bandwidth is divided into a series of non-overlapping frequency bands. Here, a data transmission is described as divided into different numbers of data layers to perform the frequency multiplexing. Spatial multiplexing may involve transmitted different portions of a data transmission in independent channels separate in space. A second embodiment may include a multi-RAT translator and end-user processing. A third embodiment may include transmission of a reference signal (RS) corresponding to the second RAT. (e.g., where a first RAT may be used to communicate between a BS to a multi-RAT translator and where a second RAT may be used to communicate between the multi-RAT translator to an electronic device). A fourth embodiment may include synchronization of a multi-RAT translator. A fifth embodiment may include feedback scheduling in a multi-RAT assisted DL transmission. It is noted that the examples of the embodiments described herein may be used alone or in various combinations with the other. For example, the fifth embodiment of feedback scheduling may be used in combination with the third embodiment of transmitting a second hop RS. Other combinations may also be suitable.

Keeping the foregoing in mind, FIG. 1 is a block diagram of an electronic device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly (e.g., not through or via another component, not via a communication bus, not via a network) or indirectly (e.g., through or via another component, a communication bus, a network) to one another to transmit and/or receive signals between one another. It should be noted that FIG. 1 is merely one example of a particular implementation and is intended to illustrate the types of components that may be present in the electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a $6^{th}$ generation (6G) or greater than 6G cellular network, a satellite network, a non-terrestrial network, and so on. In particular, the network interface 26 may include, for example, one or more interfaces for using a cellular communication standard of the 5G specifications that include the millimeter wave (mm-Wave) frequency range (e.g., 24.25-300 gigahertz (GHz)) that defines and/or enables frequency ranges used for wireless communication. The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the electronic device 10 may include any suitable source of power, such as a rechargeable lithium polymer (Li-poly) battery and/or an alternating current (AC) power converter.

Figure 2:
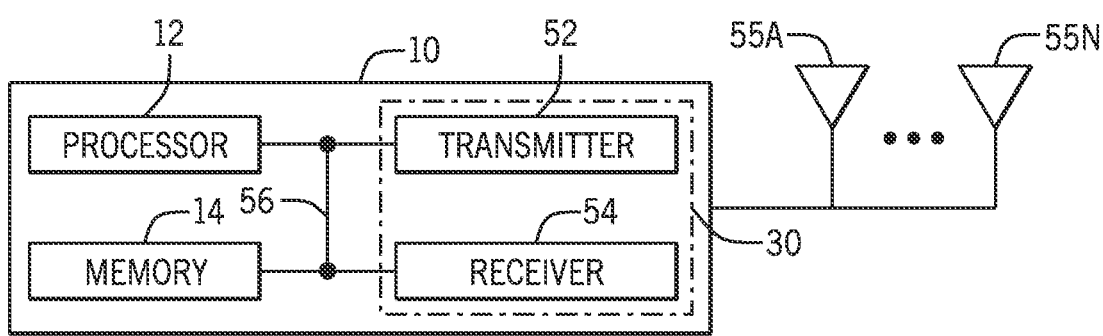
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive signals between one another.

The electronic device 10 may include the transmitter 52 and/or the receiver 54 that respectively enable transmission and reception of signals between the electronic device 10 and an external device via, for example, a network (e.g., including base stations or access points) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with one or more beams and various configurations. In some embodiments, multiple antennas of the antennas 55A-55N of an antenna group or module may be communicatively coupled to a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

Figures 3, 4:
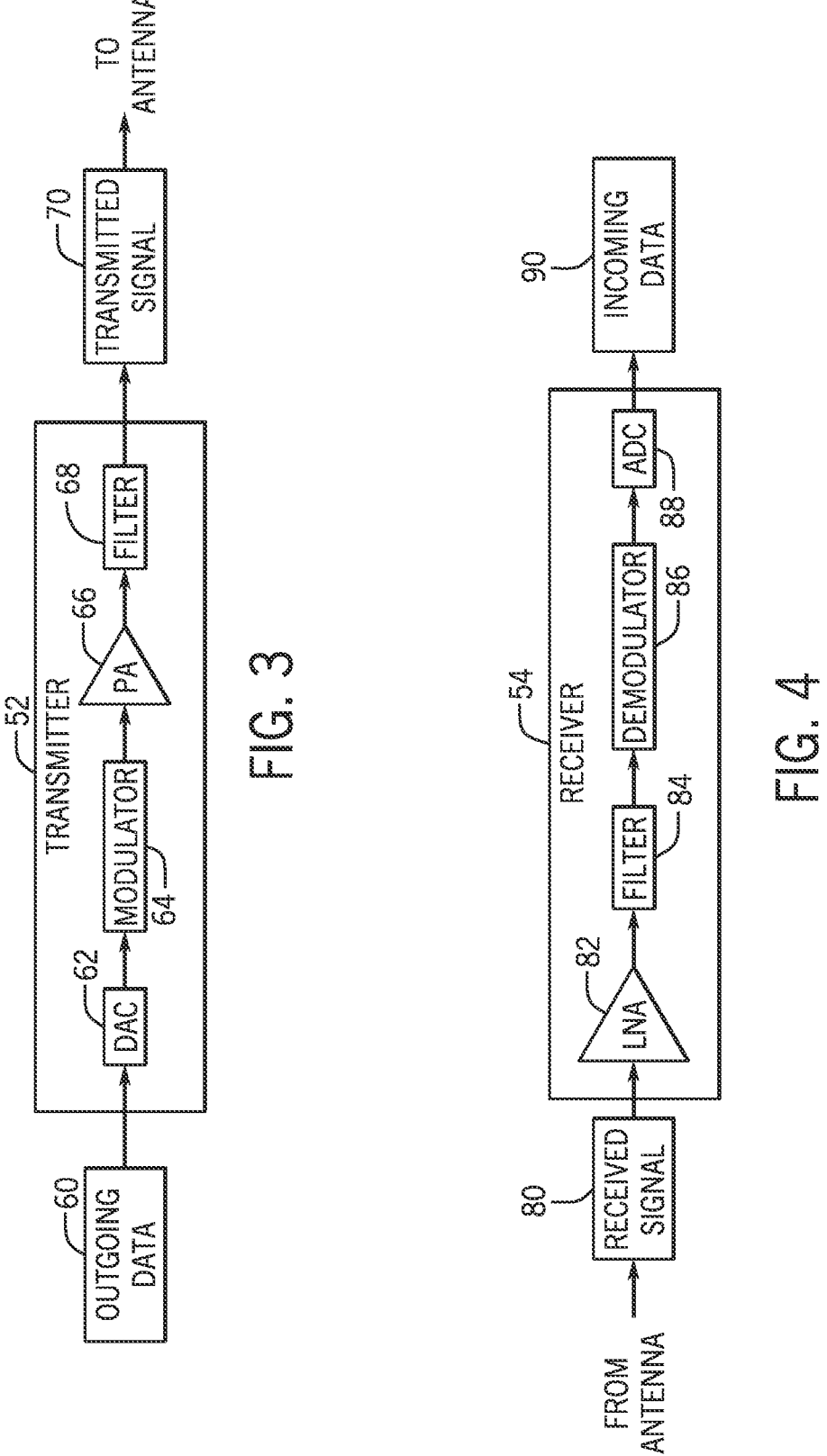
FIG. 3 is a schematic diagram of a transmitter of the electronic device of FIG. 1, according to embodiments of the present disclosure.
FIG. 4 is a schematic diagram of a receiver of the electronic device of FIG. 1, according to embodiments of the present disclosure.

FIG. 3 is a schematic diagram of the transmitter 52 (e.g., transmit circuitry), according to embodiments of the present disclosure. As illustrated, the transmitter 52 may receive outgoing data 60 in the form of a digital signal to be transmitted via the one or more antennas 55. A digital-to-analog converter (DAC) 62 of the transmitter 52 may convert the digital signal to an analog signal, and a modulator 64 may combine the converted analog signal with a carrier signal to generate a radio wave. A power amplifier (PA) 66 receives the modulated signal from the modulator 64. The power amplifier 66 may amplify the modulated signal to a suitable level to drive transmission of the signal via the one or more antennas 55. A filter 68 (e.g., filter circuitry and/or software) of the transmitter 52 may then remove undesirable noise from the amplified signal to generate transmitted signal 70 to be transmitted via the one or more antennas 55. The filter 68 may include any suitable filter or filters to remove the undesirable noise from the amplified signal, such as a bandpass filter, a bandstop filter, a low pass filter, a high pass filter, and/or a decimation filter.

The power amplifier 66 and/or the filter 68 may be referred to as part of a radio frequency front end (RFFE) 69, and more specifically, a transmit front end (TXFE) of the electronic device 10. Additionally, the transmitter 52 may include any suitable additional components not shown, or may not include certain of the illustrated components, such that the transmitter 52 may transmit the outgoing data 60 via the one or more antennas 55. For example, the transmitter 52 may include a mixer and/or a digital up converter. As another example, the transmitter 52 may not include the filter 68 if the power amplifier 66 outputs the amplified signal in or approximately in a desired frequency range (such that filtering of the amplified signal may be unnecessary).

FIG. 4 is a schematic diagram of the receiver 54 (e.g., receive circuitry), according to embodiments of the present disclosure. As illustrated, the receiver 54 may receive received signal 80 from the one or more antennas 55 in the form of an analog signal. A low noise amplifier (LNA) 82 may amplify the received analog signal to a suitable level for the receiver 54 to process. A filter 84 (e.g., filter circuitry and/or software) may remove undesired noise from the received signal, such as cross-channel interference. The filter 84 may also remove additional signals received by the one or more antennas 55 that are at frequencies other than the desired signal. The filter 84 may include any suitable filter or filters to remove the undesired noise or signals from the received signal, such as a bandpass filter, a bandstop filter, a low pass filter, a high pass filter, and/or a decimation filter. The low noise amplifier 82 and/or the filter 84 may be referred to as part of the RFFE 69, and more specifically, a receiver front end (RXI-E) of the electronic device 10.

A demodulator 86 may remove a radio frequency envelope and/or extract a demodulated signal from the filtered signal for processing. An analog-to-digital converter (ADC) 88 may receive the demodulated analog signal and convert the signal to a digital signal of incoming data 90 to be further processed by the electronic device 10. The digital signal may represent the incoming data 90 in a format used by one or more components in a digital domain and may be generated based on one or more analog signals received via the antenna 55 that may represent the incoming data in a format of an analog domain. Additionally, the receiver 54 may include any suitable additional components not shown, or may not include certain of the illustrated components, such that the receiver 54 may receive the received signal 80 via the one or more antennas 55. For example, the receiver 54 may include a mixer and/or a digital down converter.

Figure 5:
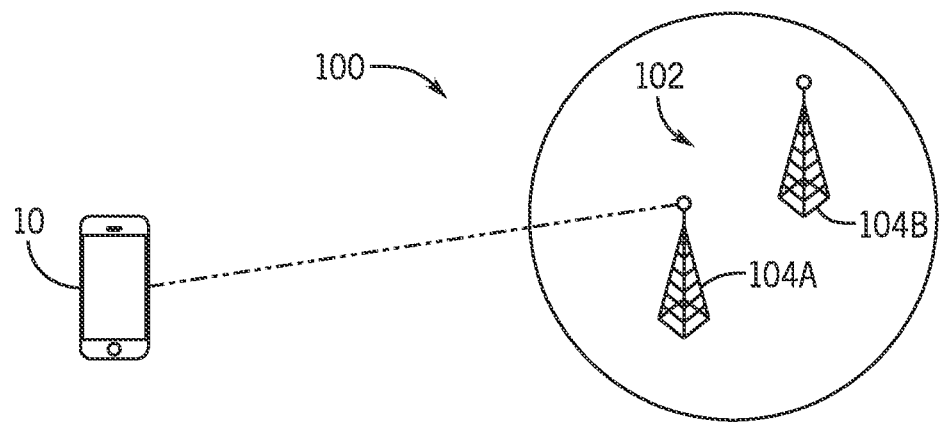
FIG. 5 is a schematic diagram of a communication system including the user equipment of FIG. 1 communicatively coupled to a wireless communication network supported by base stations, according to embodiments of the present disclosure.

FIG. 5 is a schematic diagram of a communication system 100 including the electronic device 10 of FIG. 1 communicatively coupled to a wireless communication network 102 supported by base stations 104A, 104B (collectively 104), according to embodiments of the present disclosure. In particular, the base stations 104 may include Next Generation NodeB (gNodeB or gNB) base stations and may provide 5G NR coverage via the wireless communication network 102 to the electronic device 10. The base stations 104 may include any suitable electronic device, such as a communication hub or node, that facilitates, supports, and/or implements the network 102. In some embodiments, the base stations 104 may include Evolved NodeB (eNodeB) base stations and may provide 4G/LTE coverage via the wireless communication network 102 to the electronic device 10. Each of the base stations 104 may include at least some of the components of the electronic device 10 shown in FIGS. 1 and 2, including one or more processors 12, the memory 14, the storage 16, the transceiver 30, the transmitter 52, the receiver 54, and the associated circuitry shown in FIG. 4.

It should be understood that while the present disclosure may use 5G NR as an example specification or standard, the embodiments disclosed herein may apply to other suitable specifications or standards (e.g., such as the 4G/LTE specification, a 6G specification, a beyond 6G specification, a specification that operates in the sub-THz frequency range, and so on). Moreover, the network 102 may include any suitable number of base stations 104 (e.g., one or more base stations 104, four or more base stations 104, ten or more base stations 104, and so on).

Referring now to FIG. 6, FIG. 6 is a block diagram of a first example system 120A that implements a multi-RAT translator 122 discussed above. The system 120A may use the multi-RAT translator 122 to translate communication signals between one or more radio access technologies, such as between a first radio access technology (first RAT) and a second radio access technology (second RAT). The different radio access technologies, or networks, may correspond to radio frequency signals having different frequency bands, layers, subcarrier spacing, modulations, code rates, waveforms, or the like, and thus the multi-RAT translator 122 may intermediate communications sent according to the different characteristics and enable a base station 104 of a first network to communicate with an electronic device 10 configurable to communicate on a second network.

As an example, the first RAT may correspond to (e.g., transmit and/or receive radio frequency signals having) a relatively lower frequency band (e.g., 5G NR FR1) and the second RAT may correspond to (e.g., transmit and/or receive radio frequency signals having) a relatively higher frequency band (e.g., FR2, mmW, THz, sub-THz). An example electronic device 10 (e.g., user equipment (UE)) may operate to transmit and/or receive using signals on the relatively higher frequency band (e.g., sub-THz cellular signals). In some embodiments, the electronic device 10 may use both a sub-THz antenna panel and a FR2 antenna panel. Each antenna panel may include one or more antennas 55 that may form beams for transmitting or receiving radio frequency signals.

To elaborate further, the multi-RAT translator 122 may couple between one or more network-side devices and one or more electronic devices 10 (e.g., user-side devices, user equipment (UE)) to convert communication signals between lower frequency bands (e.g., FR1 or other 5G bands) and higher frequency bands (e.g., FR2 and/or 6G/sub-THz bands). For example, the multi-RAT translator 122 may change one or more characteristics of a respective communication signal when converting from one spectrum to another. The multi-RAT translator 122 may assist a downlink (DL) and/or uplink (UL) transmission operation. The DL operation and/or UL operation may operate based on frequency multiplexing and/or spatial multiplexing. It should be understood that, while the disclosed embodiments are discussed with respect to assisting DL operations, they may similarly be applied in reverse order to UL operations in additional or alternative embodiments.

The multi-RAT translator 122 may be a new type of entity relative to existing or previous communication network systems. Indeed, the multi-RAT translator 122 may be network operator agnostic. The multi-RAT translator 122 may assist data transmissions between a network-side device and a user equipment electronic device 10. The data transmission may include a downlink communication transmission from a base station 104 (e.g., radio access node) sent to the electronic device 10. The data transmissions between the base station 104 and the electronic device 10 may involve two "hops" of an end-to-end communication link, where a first hop (corresponding to a first communication link) is between the base station 104 and the multi-RAT translators 122 and a second hop (corresponding to a second communication link) occurs between the multi-RAT translators 122 and the electronic device 10. The different communication links 124, 126 may use different radio access technologies (RATs) 128, 130 (e.g., different radio spectrums). In particular, the two communication links 124, 126 may use different frequency bands, network resources, and/or different parameters corresponding to its respective RAT 128, 130 to communicate. For example, the first communication link 124 may use a relatively lower frequency band (e.g., first RAT 128 of NR FR1), while the second communication link 126 may use a higher frequency band (e.g., second RAT 130 of NR FR2, mmW, THz, 6G, or sub-THz)

To elaborate, an example translation from the first RAT 128 to the second RAT 130 is illustrated in FIG. 7. FIG. 7 is a diagram of an example translation of signals between the first RAT 128 to the second RAT 130 shown in FIG. 6. FIG. 7 illustrates how a multi-RAT translator 122 may translate signals between a first RAT 128 and a second RAT 130 at least in part by changing a number of layers 140, a subcarrier spacing (SCS) parameter 142, a modulation parameter 144, a code rate parameter 146, and/or a waveform characterization 148, or the like, between the different RATs (e.g., represented by inset plot 150 and inset plot 152). For example, the multi-RAT translator 122 may change the waveform characterization 148 from an Orthogonal Frequency Division Multiplexing (OFDM) modulation format to a single carrier modulation format, the code rate parameter 146 from 0.75 to 0.5, the modulation parameter 144 from 256 quadrature amplitude modulation (QAM) to 16 QAM (where QAM is an amplitude modulation process to convey analog message signals by modulating the amplitudes of associated carrier waves using parameters), the SCS parameter 142 from 30 kilohertz (kHz) to 120 KHz, and a number of layers 140 from 8 to 4. One or more of the multi-RAT translators 122 may perform the translation operation to change signals compliant with the first RAT 128 into signals compliant with the second RAT 130.

It is noted that $f_0$ and $f_1$ refer to center frequencies of the respective RATs. In some cases, the $f_0$ and $f_1$ remain at a same frequency before and after the translation between the first RAT 128 and the second RAT 130. One reason this may be desirable is that circuitry of the electronic device 10 and/or of the network (e.g., base station 104) may need not be recalibrated to a new center frequency. However, in some cases the frequency value changes between $f_0$ and $f_1$, such as in a frequency diversity operation and/or in a frequency multiplexing operation, and thus the circuitry of the electronic device 10 and/or of the network (e.g., base station 104) may shift appropriately to difference frequencies to accommodate the change between $f_0$ and $f_1$ (e.g., based on control signal instruction or timed interval monitoring).

Although FIG. 6 illustrates a single electronic device 10 communicating with multiple multi-RAT translators 122, it is noted that any suitable number of electronic devices 10 may communicate with any suitable number of multi-RAT translators 122, which may be used to translate between any suitable number of RATs. For example, FIG. 8 is a block diagram illustrating that multiple electronic devices 10 may be assisted by multiple multi-RAT translators 122. Communications to and/or from one or more of the electronic devices 10 may be translated and processed one or more of the multi-RAT translators 122. In this case, the first communication link 124 may include a multiple user, multiple input, and multiple output (MU-MIMO) transmission between the base station 104 and the multi-RAT translators 122.

A multi-RAT translator 122 or a group of multiple multi-RAT translators 122 may have more antennas (and processing circuitry) and thus more capability to send or receive larger bandwidths or wider varieties of datasets compared to an electronic device 10 (e.g., end-user user equipment like a mobile phone). As described above, some models of electronic devices 10 may receive a maximum number of layers that corresponds to a total number of antennas of the electronic device 10, which may be constrained due to a desired footprint of RF circuitry within an electronic device 10. For example, a respective electronic device 10 may receive a maximum of four downlink via four layers due to a number of antennas 55 being limited to four antennas 55. One benefit to using a multi-RAT translator 122 may be that it is more flexible in the number of antennas that it may be equipped with relative to that of electronic devices 10. Moreover, even if a single multi-RAT translator 122 has four RX antennas 55 like the electronic devices 10, the joint use of multiple multi-RAT translators 122 to assist communications to the electronic device 10 may functionally increase the number of RX antennas 55 at the multi-RAT translators 122, and thus may increase the number of DL transmission layers, granting relatively more flexibility in deployment.

There may be additional benefits to using the proposed DL multi-RAT translator 122 over other systems. First, multi-RAT translators 122 may not terminate a data plane, which may improve connectivity between the first RAT 128 and the second RAT 130. Second, multi-RAT translators 122 may not use SIM cards and/or may be transparent to a base station 104. Third, multi-RAT translators 122 may be installed at fixed locations (e.g., walls of a building or of a room within a building), vehicles, and/or be portable. Furthermore, multi-RAT translators 122 may be used to assist data transmission independent of the first RAT 128 operator accommodating the use of the multi-RAT translator 122. Indeed, a control channel (e.g., a Physical Downlink Control Channel (PDCCH)) message may continue to be sent to and received by the electronic device 10 directly (e.g., via FR1 RAT), which may enable current methods for electronic device 10 network registration to remain unchanged and compatible with the multi-RAT translators 122.

Multi-RAT translators 122 may change data transmission characteristics to step up or step down between RATs. This may involve changing signals based on different numbers of antennas and/or transmission characteristics associated with the different RATs, as described further with FIGS. 9A-9C and FIG. 10.

To elaborate, FIG. 9A-9C are timing diagrams illustrating a translation of spatial multiplexing to time or frequency multiplexing (e.g., spatial multiplexing data format, frequency multiplexing data format, time multiplexing data format). Spatial multiplexing may help to improve data rates and/or data throughput in a network by increasing a number of layers used to transmit data. In particular, frequency multiplexing is a process by which a bandwidth is divided into a series of non-overlapping frequency bands. Here, a data transmission is described as divided into different numbers of data layers transmitted at different carrier frequencies to perform the frequency multiplexing. Spatial multiplexing may involve transmitted different portions of a data transmission (e.g., different layers) in independent channels separated in space. Indeed, a respective layer is a data channel separated in space from other layers used to transmit other data signals of a communication. Time multiplexing is a process by which a data transmission is divided into different portions transmitted at non-overlapping times.

The base station 104 may decide the number of layers, M layers 170, to use to transmit the data via the first communication link 124. M layers 170 refers to the number of MIMO layers used by the base station 104 to transmit a data packet via the communication link 124, and thus corresponds to MIMO layers received by the multi-RAT translator 122 to be converted for transmission to the electronic device 10 as the M1 data streams 172 and the M2 data streams 174. In this way, the processing performed by the multi-RAT translator 122 may use one layer but may be based on data received by multiple antennas of the multi-RAT translator 122. The multi-RAT translator 122 may pass on the M layer 170 data to the electronic device 10 with varying amounts of processing, as will be appreciated. The multi-RAT translators 122 may translate the M layers 170 into separate transmissions of M1 data streams 172 and M2 data streams 174 in second communication link 126, where a number of M1 data streams 172 may be less than a number of M layers 170, and where a number of M2 data streams 174 may be less than a number of M layers 170.

For example, a base station 104 may include 192 antennas (e.g., a first number of antennas) while electronic device 10 may include four antennas (e.g., a second lower number of antennas) and the multi-RAT translator 122 may include eight antennas. Thus, the multi-RAT translator 122 may use its eight antennas to intercept a transmission to the electronic device 10 and down-convert the M layers 170 into a format compatible with the electronic device 10. Processing performed by the multi-RAT translator 122 may be configurable to be compatible with a wide variety of systems, including being configurable in time transmission, carrier frequency, resource blocks, spatial configurations, and the like. Thus, the M layers 170 may undergo some reconfiguration and/or processing to generate the respectively transmitted the M1 data streams 172 and/or the M2 data streams 174.

To help explain, FIG. 9A is a timing diagram that illustrates spatial multiplexing to time multiplexing translations. Indeed, one or more multi-RAT translators 122 may translate data of a first communication link 124, M layers 170, into time multiplexed data streams of a second communication link 126, M1 data streams 172 and M2 data streams 174. The M1 data streams 172 and the M2 data streams 174 may use a substantially overlapping carrier frequency, and thus are to be separated over time (e.g., axis 176) as opposed to carrier frequency (e.g., as shown in FIG. 9B).

FIG. 9B and FIG. 9C are timing diagrams that illustrate spatial multiplexing to frequency multiplexing translations. One or more multi-RAT translators 122 may translate M layers 170 into frequency multiplexed M1 data streams 172 and M2 data streams 174. In FIG. 9B, the M1 data streams 172 and the M2 data streams 174 may be separated over different carrier frequencies (e.g., $f_1$ is different from $f_2$) via frequency multiplexing. However, in FIG. 9C, the multi-RAT translators 122 separate the M1 data streams 172 and the M2 data streams 174 on to different resource blocks (RB) and thus the data streams are separated based on RB multiplexing. In FIG. 9C, the M1 data streams 172 and the M2 data streams 174 may have a same carrier frequency and may be transmitted at an at least partially overlapping time but are kept separate due to the different RB assignments.

FIG. 10 is a block diagram that illustrates spatial multiplexing translations in terms of multiple translators. Indeed, multiple multi-RAT translators 122A, 122B may translate data of a first RAT 128 into multiple data streams of a second RAT 130. This may enable antennas of the respective RAT translators 122 to receive signals from the base station 104 via the first RAT 128 and translate onto different data streams 172, 174 to implement spatial multiplexing of the second RAT 130. Different multi-RAT translators 122A, 122B process the M layer 170 on the first communication link 124 (e.g., first RAT 128) to generate the M1 data stream 172 and the M2 data stream 174, respectively enabling the separation between the M1 data stream 172 and the M2 data stream 174. Once generated, the M1 data stream 172 and the M2 data stream 174 are respectively communicated on the second communication link 126 (e.g., the second RAT 130) to the electronic device 10.

In each of the examples of FIGS. 9A-9C and FIG. 10, the multi-RAT translator 122 is processing a same number of M layers 170 into different data streams (e.g., the M1 data stream 172 and the M2 data stream 174) with a reduced number of layers. In this way, the different data streams transmitted from the multi-RAT translator 122 may have different data relative to each other but a subset of data/a subset of signals reformatted relative to M layers 170. This is contrasted to embodiments of FIGS. 11A-11C and FIG. 12, which show the case where the multi-RAT translator 122 may generate separate data streams with the same data (referred to as diversity).

Referring now to FIGS. 11A-11C and FIG. 12, the multi-RAT translators 122 may translate the M layers 170 into the M layers 190, 192 based on time diversity (e.g., FIG. 11A) and/or frequency diversity (e.g., FIG. 11B, FIG. 11C) and/or spatial diversity (e.g., FIG. 12) (e.g., spatial diversity data format, frequency diversity data format, time diversity data format). Diversity translations may provide diversity gain and may improve reliability by repeating data transmitted.

FIG. 11A is a timing diagram that illustrates translating the transmission with time diversity. One or more multi-RAT translators 122 may translate M layers 170 of the first communication link 124 into same data streams (e.g., the M layer 190 and the M layer 192 have the same data as M layer 170) separated based on time diversity. Indeed, one or more multi-RAT translators 122 may generate two transmissions of the M layers 190, 192 and may be from either a single multi-RAT translator 122 or multiple multi-RAT translators 122. The two transmissions of M layers 190, 192 may be separated over time via time diversity. It is noted that a number of layers does not change between the first RAT 128 data transmission via the first communication link 124 and the second RAT 130 data transmissions via the second communication link 126.

FIG. 11B and FIG. 11C are timing diagrams that illustrate frequency diversity translations. One or more multi-RAT translators 122 may translate a data stream of the first communication link 124 into same data streams (e.g., the M layer 190 and the M layer 192) separated based on frequency diversity. Indeed, one or more multi-RAT translators 122 may generate two transmissions of the M layers (e.g., the M layer 190 and the M layer 192) and may be from either a single multi-RAT translator 122 or multiple multi-RAT translators 122. For example, the M layer 190 and the M layer 192 may have the same or substantially similar data transmitted while having different carrier frequencies. The two transmissions of M layers 190, 192 may have different carrier frequencies and thus implement frequency diversity in FIG. 11B. However, in FIG. 11C, the M layers 190, 192 may have a same carrier frequency and be assigned different resource blocks (RB) to implement frequency diversity. It is noted that a number of layers may not change between the first RAT 128 and the second RAT 130 transmissions.

FIG. 12 is a block diagram that illustrates translating the transmission with spatial diversity. Different multi-RAT translators 122A, 122B process the M layer 170 on the first communication link 124 (e.g., first RAT 128) to generate the M layer 190 and the M layer 192, respectively, to implement spatial diversity. Despite having repeated data, M layers 190 and M layers 192 are transmitted at least a partially overlapping time (e.g., concurrently or simultaneously) and separately to the electronic device 10. Once generated, the M layer 190 and the M layer 192 are respectively communicated on the second communication link 126 (e.g., the second RAT 130) to the electronic device 10.

Referring now to example implementations of a multi-RAT translator 122 and the electronic device 10. FIG. 13 illustrates an example multi-RAT translator 122 that shows example operations carried out when translating DL transmissions. FIGS. 14-15 illustrate a first system implementation based on an example multi-RAT translator 122 that removes a cyclic prefix (CP) before translation, where FIG.

16 is an example of the first system. FIGS. 17-18 illustrate a second system implementation based on a second example multi-RAT translator 122 that removes a CP and performs a demodulation before translation, where FIGS. 19-20 are corresponding examples of the second system. FIGS. 21-22 illustrate a third system implementation based on a third example multi-RAT translator 122 that removes the CP and demodulates before the translation and, after translation, adds a reference signal corresponding to the second RAT 130, where FIGS. 23-25 are examples of the third system (e.g., FIG. 24 is a first example electronic device 10 that demodulates and processes 4-layer data separately before combining near the end while FIG. 25 is a second example electronic device 10 that combines two 4-layer data sets into one 8-layer data set before demodulation and processing). FIGS. 26-27 illustrate a fourth system implementation based on a fourth example multi-RAT translator 122 that adds channel estimation and MIMO equalization based on first RAT 128 parameters before translation. FIGS. 28-29 illustrate a fifth system implementation based on a fifth example multi-RAT translator 122 that performs channel decoding based on first RAT 128 parameters before translation and channel encoding based on second RAT 130 parameters after translation. It is noted that a single multi-RAT translator 122 and/or multiple multi-RAT translators 122 may communicate between the base station 104 and the electronic device 10, as described herein. Furthermore, additional or fewer components may be included in any of the base station 104, electronic device 10, and/or multi-RAT translator 122 that is described herein. For example, in each of the systems described in FIGS. 14-29, the example multi-RAT translators 122 and/or the example electronic devices 10 may include the receiver 54, the transmitter 52, the ADC 88, the DAC 62, among other components, that are not specifically illustrated despite being used to perform operations actually illustrated in the respective figures. It is also noted that these examples are described in terms of downlink (DL) operations that originate at the base station 104 and are transmitted to the electronic device 10. However, similar systems may be used for uplink (UL) operations that originate at the electronic device 10 and are transmitted to the base station 104 as long as the RX-TX direction of data and processing flow are reversed. That is, the multi-RAT translator 122 may include a receiver 54 able to receive data on the second RAT 130, processing circuitry to translate signals from the second RAT 130 to the first RAT 128, and a transmitter 52 to transmit the translated signals on the first RAT 128. This may be extrapolated and applied to the other examples and intermediary circuitry described herein.

In each of the examples described herein, the translation controller 222 may perform different operations to convert the data from the first RAT 128 to the second RAT 130 depending on the application and the first RAT 128 and second RAT 130 configurations. For example, translation from the first RAT 128 to the second RAT 130 may include translating between spatial multiplexing into time multiplexing (e.g., different slots), frequency multiplexing (e.g., different carrier frequencies), spatial diversity, time diversity, and/or frequency diversity configured RATs.

Referring now to FIG. 13, FIG. 13 is a block diagram of an example multi-RAT translator 122 that shows example operations carried out when translating DL transmissions, which may include additional or alternative components to those illustrated. Each multi-RAT translator 122 (e.g., DL multi-RAT translator 122) may receive RF signals from a base station 104 via antennas 55 using parameters compliant with a first RAT 128 (e.g., FR1). Signals from the antennas 55 (e.g., input signals) may be received by receiver 54 (operations of block 214). The processor 12 and/or control circuitry of the receiver 54 may translate received data from the first RAT 128 into the second RAT 130 (operations of block 216). Sometimes intermediate signals are generated while preparing the input signals for the translation, during the translation, and while preparing translated signals to be transmitted as output signals. The transmitter 52 may transmit the translated data (e.g., output signals) in the second RAT 130 to the electronic device 10 (operations of block 218). It is noted that when operational blocks are illustrated in the figures, these said operations may be performed by one or more portions of the electronic device 10 and/or the multi-RAT translator 122 (e.g., another electronic device 10), such as the processor 12, the receiver 54, and/or the transmitter 52.

Thus, with the assistance of multi-RAT translator 122, the electronic device 10 may receive and process the data of the second RAT 130 on the higher frequency band, which may be based on the second RAT 130 parameters. The electronic device 10 may translate reversely and process the data of the first RAT 128 on the lower frequency band (e.g., FR1), which may be based on the first RAT 128 parameters.

The multi-RAT translator 122 may include any suitable circuitry to translate between one or more RATs. Although any suitable circuitry may be used to implement the multi-RAT translator 122, five example system implementations are described herein.

For the first example implementation, FIG. 14 is a block diagram of a first example multi-RAT translator 122 that removes a CP before translation and is illustrated with operational blocks corresponding to operations of components of the multi-RAT translator 122. The multi-RAT translator 122 may receive a transmitted signal 70A (of a first RAT 128) (operations of block 230) and may perform an analog-to-digital conversion of the transmitted signal 70A to generate data (operations of block 232). The multi-RAT translator 122 may process the data in a time domain until performing cyclic prefix (CP) removal operations (operations of block 234) when there are no OFDM demodulation operations. Once the data has been digitally converted, the multi-RAT translator 122 (via processor 12) may process the data in a bit domain. A CP remover or other suitable processing circuitry may remove CPs and otherwise prepare data to be translated.

The multi-RAT translator 122 may translate the data (e.g., reconfigure) to be compatible with the second communication link 126 configurations (operations of block 236). For example, a sampling rate of the second communication link 126 may be larger than the sampling rate of the first communication link 124. Indeed, if both communication links 124, 126 use OFDM with 30 kHz subcarrier spacing (SCS) for the first communication link 124 while 120 kHz SCS is used for the second communication link 126, the sampling rate of the second communication link 126 may be four times of the sampling rate of the first communication link 124.

After the translation, the multi-RAT translator 122 may add back a CP for the second RAT 130 to the translated data (operations of block 238). The modified data may undergo a digital-to-analog conversion (e.g., via the DAC 62) at operations of block 240. Once converted, the converted analog signal may be transmitted (e.g., via transmitter 52) as the transmit signal 70B of the second RAT 130 (operations of 242).

An example electronic device 10 is illustrated in FIG. 15 that corresponds to the multi-RAT translator 122 of FIG. 14. FIG. 15 is a block diagram of an example electronic device 10 corresponding to user equipment that receives signals from the multi-RAT translator 122 of FIG. 14 and removes the CP of the signals based on second RAT 130 parameters and demodulates the signals based on first RAT 128 parameters after removing the CP and before reverse translating the signals. To elaborate, the electronic device 10 may receive the transmitted signal 70B from the multi-RAT translator 122 via the receiver 54 (operations of block 250) and perform an analog-to-digital conversion of the transmit signal 70B via the ADC 88 (operations of block 252). The electronic device 10 may remove CPs from the transmitted signal 70B, now a digital signal, (operations of block 254) in the bit domain before sending the modified transmitted signal to the demodulator 86 to be processed as first RAT 128 data (operations of block 256). The electronic device 10 may reverse translate the demodulated data to generate data that complies with the first RAT 128 (operations of block 258). At block 260, further RX processing may be performed, such as channel estimation, demodulation, channel decoding using first RAT 128 parameters, and the like, to prepare the incoming data 90 for use by other systems of the electronic device 10. After performing further RX processing, the electronic device 10 (e.g., via processor 12) may transmit the resulting signals as incoming data 90 compatible with the first RAT 128 to another circuitry of the electronic device 10. It is noted that the incoming data 90 may be the same or substantially similar as the data being translated at the operations of block 236 of FIG. 14.

Elaborating more on FIGS. 14-15, FIG. 16 is a block diagram of an example implementation of systems and methods of FIGS. 14 and 15. Some components of FIG. 16 have been described herein and thus previous descriptions are relied on.

The base station 104 may transmit signals 70 via the first communication link 124 of the first RAT 128. Here, the base station 104 may transmit 8-layer data using NR FR1 OFDM with 30 kHz SCS and a sampling rate of $f_s$. Since the base station 104 transmits eight layers, the two multi-RAT translators 122A, 122B may each intercept four layers of the total eight layers (e.g., four layers to multi-RAT translator 122A and the remaining four to multi-RAT translators 122B the transmitted signal 70A) transmitted to the electronic device 10. The electronic device 10 may include four RX antennas 55. Each multi-RAT translators 122A, 122B may include four RX antennas and four TX antennas (or one or more antennas that both receive and transmit).

The multi-RAT translators 122A, 122B may translate from spatial multiplexing to frequency multiplexing.

Both multi-RAT translators 122A, 122B may receive eight layers of data and down-convert and/or process with first RAT 128-compatible parameters (operations of block 270). The operations of block 270 may correspond to and/or include operations of block 230. The multi-RAT translators 122A, 122B may perform analog-to-digital conversions based on the signals resulting from the operations of block 270 (operations of block 272). Between operations of block 274 and block 276, both multi-RAT translators 122A, 122B may translate data from the block 274 into the second RAT 130 to prepare for the second communication link 126 transmission. The multi-RAT translators 122A, 122B may do so using the processed received data and the second RAT 130-compatible parameters (e.g., FR2 OFDM with a sampling rate of $4*f_s$). Both multi-RAT translators 122A, 122B may use first RAT 128 characteristics of OFDM with 5G NR FR1 30 kHz SCS and may use second RAT 130 characteristics of 5G NR FR2 120 kHz SCS. Other suitable ranges for the SCS may be used, such as a frequency range of 20-40 kHz and/or 110-130 kHz.

After any translation is performed between the operations of block 274 and the operations of block 276, the multi-RAT translators 122A, 122B may add a FR2 CP as the second RAT 130 CP. At the operations of block 278, the multi-RAT translators 122A, 122B may perform a digital-to-analog conversion of the resulting translated data using a sampling rate of $4*f_s$. Once processing is complete, the multi-RAT translator 122A may transmit second RAT 130-compatible data at a carrier frequency $f_1$ as the M1 data stream 172 to the electronic device 10 (operations of block 280). At an at least partially overlapping time (e.g., simultaneous, substantially simultaneous), the multi-RAT translator 122B transmits second RAT 130-compatible data as the M2 data stream 174 at a carrier frequency $f_2$ to the electronic device 10 (operations of block 280).

After receiving and down-converting signals on both carrier frequencies $f_1$ and $f_2$ (operations of block 282), the electronic device 10 may use a sampling rate of $4*f_s$ to convert received analog signals into digital signals (operations of block 284). The electronic device 10 may then remove one or more CPs from the resulting digital signals (operations of block 286). The electronic device 10 may perform a FR1 OFDM demodulation on the processed signals from the operations of block 286 (operations of block 288). The electronic device 10 may perform a reverse translation from frequency multiplexing to spatial multiplexing (e.g., from two 4-layer data to one 8-layer data) compatible with the first RAT 128 (operations of block 290). The electronic device 10 may perform channel estimation, MIMO equalization, demodulation, channel decoding, and/or other processing operations using 1-R1 parameters compatible with the first RAT 128 (operations of block 292). The channel estimation to estimate an equivalent two hop cascaded channel (e.g., base station 104 to multi-RAT translator 122 to electronic device 10). The electronic device 10 processing may occur based on both the M1 data stream 172 and the M2 data stream 174. The resulting data may be transmitted to other components of the electronic device 10 (e.g., circuitry disposed outside or external to a RF front end that may perform some or all of the operations of blocks 282-292).

It is noted that for FIGS. 17-29, some components and operations are the same or substantially similar to those described with respect to FIGS. 1-16. Thus, this similar description may not be duplicated but referred to herein.

Referring now to FIG. 17, FIG. 17 is a block diagram of a second example multi-RAT translator 122 that removes a CP and performs a demodulation before translation. The multi-RAT translator 122 may receive a transmitted signal 70A via the first RAT 128 and may convert the transmitted signal 70A to a digital signal (operations of block 230 and 232). The processing operations may occur in the frequency domain until OFDM demodulation and CP removal operations (operations of block 310).

Comparing this multi-RAT translator 122 to that of FIG. 15, the transmit signal 70A is being demodulated in this example. Thus, the inclusion of demodulation operations at block 310. The TX baseband digital processing operations (operations of block 312) for the second RAT 130 signals may be based on modulated symbols (e.g., no bit domain processing, or channel coding, at the multi-RAT translator 122). Operations of block 312 may include precoding, resource mapping, OFDM modulation, adding CP, or the like. It is noted that the TX baseband digital processing of block 242, the digital-to-analog conversion operations of block 240, and transmitting the second RAT 130 transmit signal 70B (operations of block 242) are based on the second RAT 130 parameters. No new reference signal may be added for the second communication link 126. Once done being processed, the translated signal may be transmitted via the transmitter 52 as the second RAT 130 transmit signal 70B to the electronic device 10 (operations of block 242). Correspondingly, end-user processing of this option of FIG. 17 is shown in FIG. 18.

An example electronic device 10 is illustrated in FIG. 18 that corresponds to the multi-RAT translator 122 of FIG. 17, where the electronic device 10 may remove the CP and perform a demodulation both based on second RAT 130 parameters before performing a reverse translation based on first RAT 128 parameters. FIG. 18 is a block diagram of an example electronic device 10 corresponding to user equipment able to receive signals from the multi-RAT translator 122 of FIG. 17. Operations of this example electronic device may be substantially similar to that of FIG. 15 with a few differences.

One difference is that the electronic device 10 may perform channel estimation, MIMO equalization, and demodulation operations (operations of block 320) to "reverse out" processing added to the original first RAT 128 transmit signal 70A by the multi-RAT translator 122. In this way, operations performed by the electronic device 10 to reverse translations made by the multi-RAT translator 122 may be the same but reverse of those performed to translate the first RAT 128 signals into the second RAT 130 signals. It is noted that the channel estimation (operations of block 320) may be used to estimate the equivalent two-hop cascaded channel (e.g., BS to multi-RAT translator 122 to end-user). It is noted that in some cases, an order of operations of the channel estimation, the MIMO equalization, the demodulation, and/or the reverse translation may change as is suitable to the system.

Another difference may be that the channel decoding is performed (operations of block 322) after the reverse translation operations of block 258. Yet another difference is that the demodulation operations of block 256 may be performed according to second RAT 130 parameters (e.g., as indicated by placement in "Step 1: reception processing of the second RAT 130 data") as opposed to first RAT 128 parameters.

Elaborating more on FIGS. 17-18, FIG. 19 is a block diagram of an example implementation of systems and methods of FIGS. 17-18. Some components of FIG. 19 have been described herein and thus previous descriptions are relied on.

Comparing FIG. 19 to FIG. 16, the examples are similar with a few differences. As in the example of FIG. 16, the first RAT 128 corresponds to a NR FR1 network that uses eight-layer data with OFDM, 30 Khz SCS, and a sampling rate of $f_s$. Furthermore, as in the example of FIG. 16, the second RAT 130 corresponds to a NR FR2 network that uses four-layer data with OFDM, 120 KHz SCS, and a sampling rate of $4*f_s$. However, the multi-RAT translators 122A, 122B of FIG. 19 may translate from spatial multiplexing to time multiplexing using similar operations to those described in FIG. 16 (as opposed from spatial multiplexing to frequency multiplexing) with the addition of FR1 CP removal and OFDM demodulation operations of block 330. The operations of block 330 may correspond to operations of block 310 and the operations of blocks 236 and 312 may be performed in the example of FIG. 19 without being particularly illustrated.

Once processing is complete, the multi-RAT translator 122A may transmit second RAT 130-compatible data at a carrier frequency $f_1$ as the M1 data stream 172 to the electronic device 10. At a non-overlapping time, the multi-RAT translator 122B transmits second RAT 130-compatible data as the M2 data stream 174 at a carrier frequency $f_1$ to the electronic device 10. Transmitting at different times enables time multiplexing.

The base station 104 may transmit eight layers to the electronic device 10 and thus the two multi-RAT translators 122A, 122B may each intercept four layers of the total eight layers (e.g., four layers to multi-RAT translator 122A and the remaining four to multi-RAT translators 122B the transmitted signal 70A) transmitted to the electronic device 10. The base station 104 may transmit an eight-layer data at slot to using NR FR1 OFDM with 30 kHz SCS and a sampling rate of $f_s$. Both DL multi-RAT translators 122 may receive the eight-layer data at slot to and process the received data using the first RAT 128 parameters. Both DL multi-RAT translators 122 prepare for the second communication link 126 transmission at least in part using the processed received data and the second RAT 130 parameters (e.g., FR2 data and parameters corresponding to FR2 OFDM with a sampling rate of $4*f_s$).

The electronic device 10 may include four RX antennas 55 while each multi-RAT translators 122A, 122B may include four RX antennas and four TX antennas (or one or more antennas that do both RX and TX). The multi-RAT translators 122 may offset the respective signal transmissions by a duration of time $(t_2-t_1)$ to provide the time multiplexing. Indeed, a first multi-RAT translator 122 may transmit four layers of data to the electronic device 10 at the first RAT 128 slot $t_1$ while a second multi-RAT translator 122 may transmit the other four layers of data to the electronic device 10 at the second RAT 130 slot $t_2$. In this way, the translation at the two multi-RAT translators 122 may be realized from spatial multiplexing to time multiplexing. The electronic device 10 generates the processed incoming data 90 based on the received transmit signals 70B received in the different slots $t_2$ and $t_1$, which may enable synchronizing of the data transmission despite the data transmitted being separated into different portions transmitted at different times.

To elaborate, FIG. 20 is a block diagram the electronic device 10 of FIG. 19 that receives different portions of a transmission in different time slots (e.g., time multiplexing). Indeed, the electronic device 10 receives transmit signals 70B via the second RAT 130 at a first slot $t_1$ (operations of block 340) and transmit signals 70B via the second RAT 130 at a first slot $t_2$ (operations of block 342). The receptions may occur at different times (e.g., $t_1$ and $t_2$). Operations of blocks 340, 342 correspond to the receive operations of block 250 but done so for a respective slot at different times rather than at a same time.

After receiving the transmitted signals 70B of the first slot $t_1$ at block 340, the electronic device 10 may perform second RAT 130 reception processing (operations of block 344) involves a down-conversion of the received signals from the second RAT 130 (e.g., FR2) (operations of block 346), an ADC operation based on a sampling rate of $4*f_s$ (operations of block 284) and CP removal operations (operations of block 286). The operations of block 346 may involve some of the operations of block 282 of FIG. 16. The processed data may be buffered (operations of block 348) and collected (operations of block 350) while reception and processing of data for slot $t_2$ occurs (operations of blocks 342 and 344) similar to operations of blocks 340 and 344 for the slot $t_1$.

Once both data for slot $t_1$ and data for slot $t_2$ are collected (at block 350), the electronic device 10 may perform demodulation operations (operations of block 288). Demodulated data may then be processed to translate from time multiplexing to spatial multiplexing (operations of block 290), such as translating two 4-layer data to one 8-layer data. The translated data may then be processed by operations of block 292. That is, the translated data may undergo channel estimation, MIMO equalization, demodulation, and/or channel decoding using parameters of the first RAT 128.

Elaborating now on yet another example multi-RAT translator 122, FIG. 21 is a block diagram of another example multi-RAT translator 122 that removes the CP and demodulates before the translation and, after translation, adds a reference signal corresponding to the second RAT. FIG. 22 is a block diagram of another example electronic device 10 that corresponds to the multi-RAT translator 122 of FIG. 21, where the electronic device removes the reference signal, the CP, and demodulates based on second RAT 130 parameters before reverse translation. For ease of explanation, FIGS. 21-22 are described together.

In this example, relative to earlier examples of FIGS. 13-20, an additional reference signal (RS) is added for the second RAT 130 (operations of block 360 of FIG. 21). Adding a reference signal for the second RAT 130 enables the electronic device 10 to estimate the communication links (e.g., communication links 124, 126) separately when performing channel estimation and associated operations. Separate estimations may enable each RAT to use different waveform modulations (e.g., first RAT 128 uses OFDM while second RAT 130 uses single carrier frequency modulation) as opposed to the previous examples where each RAT were both using the same waveform modulation (e.g., both RATs used OFDM in FIGS. 16 and 19 examples). To accommodate the different waveform modulations, the electronic device 10 of FIG. 22 performs a first set of channel estimation, MIMO equalization, and/or demodulation operations for the second RAT 130 (operations of block 372) and a second set of channel estimation, MIMO equalization, and/or demodulation operations for the first RAT 128 (operations of block 374). Signals resulting from the first set of operations at block 372 may be used to perform the second set of operations at block 374. It is noted that in some cases, the order of operations of block 258 and of block 374 are exchanged.

To elaborate further on FIGS. 21-22, FIG. 23 is a block diagram of example systems and methods corresponding to systems and methods of FIGS. 21-22, where the multi-RAT translator 122 of FIG. 21 has eight receiver antenna and four transmitter antennas while the electronic device 10 of FIG. 22 has four receiver antennas. In FIG. 21, the base station 104 may transmit eight layers to the electronic device 10 and the multi-RAT translator 122 may translate signals from spatial multiplexing into frequency multiplexing. The electronic device 10 may have four RX antennas 55 (e.g., Y number of RX antennas 55) while the multi-RAT translator 122 may have eight RX antenna (e.g., 2*Y RX antennas 55) and four TX antennas 55 (e.g., Y TX antennas 55). Both RATs may use OFDM. The first RAT 128 may use 5G NR FR1 30 kHz SCS and the second RAT 130 may use 1-R2 120 kHz SCS.

In this example, the base station 104 sends the first RAT 128 transmit signal 70A using 8 layers. The multi-RAT translator 122 intercepts the first RAT 128 transmit signal 70A (operations of blocks 230 and 232) and translates it into four-layer data via increasing the number of used resource blocks (RBs) (operations of blocks 310 and 236), adds new RS for second RAT 130 (operations of block 360), and prepares for the second communication link 126 transmission on FR2 (operations of blocks 380, 382, 240, and 242). At blocks 380 and 382, the electronic device 10 may, via the processor 12, perform precoding operations, resource mapping, OFDM modification, and adding a CP. In this way, the translation is performed from spatial multiplexing into frequency multiplexing, as represented via inset plot 384 that illustrates different RBs of the same carrier frequency for the first RAT 128 and how the layers are translated to the second RAT 130.

FIG. 24 and FIG. 25 detail two possible example electronic devices 10 that may be used in combination with systems and methods of FIG. 21-23. Indeed, FIG. 24 is a block diagram illustrating a first example of the electronic device 10 in FIGS. 22 and 23, where the electronic device performs first RAT channel estimation, multiple-inputs, multiple-outputs (MIMO) equalization and demodulation for the two sets of 4-layer data separately and combines the LLR results for the two sets. Here, the electronic device 10 may translate the second RAT 130 transmit signal 70B based on resource demapping and Log-Likelihood Ratio (LLR) results, among other operations.

The electronic device 10 may receive the second RAT 130 transmit signal 70B at antennas 55 in association with operations of block 250. The electronic device 10 may perform analog-to-digital conversions on the received transmit signal 70B (operations of block 252). The processor 12 or other suitable circuitry of the electronic device 10 may remove CP from the received transmit signal 70B and demodulate OFDM (operations of block 310). Using the processed signals from the block 310, the processor 12 may perform FR2 resource demapping, channel estimation, and/or MIMO equalization (operations of block 390). Channel estimation may be separately performed for the second communication link 126 and the first communication link 124. Using results from the operations of block 390, the processor 12 of the electronic device 10 may perform FR1 channel estimation, MIMO equalization, and demodulation for the two sets of four-layer data (e.g., data streams) separately (operations of block 392). The electronic device 10 and/or the processor 12 may combine the LLR results for the two sets of four data streams (operations of block 394) before sending the signals to channel decoding (operations of block 396). After channel decoding, the electronic device 10, via the processor 12, may transmit the processed incoming data 90 for use by downstream circuitry external to the processor 12 and/or a RF front end performing the processing operations.

FIG. 25 is a block diagram illustrating a second example of the electronic device 10 in FIGS. 22 and 23, where the electronic device reversely translates the two sets of 4-layer data into one set of 8-layer data and continues further processing on the 8-layer data. In this example, the electronic device 10 may receive and process the second RAT 130 transmit signal 70B in a same or similar way that the electronic device 10 of FIG. 24 does up through FR2 resource demapping and associated operations (e.g., blocks 250, 252, 310, and 390). The electronic device 10 may reversely translate from one set of eight-layer data to two sets of the four-layer data (operations of block 402). The electronic device 10 may perform channel estimation, MIM equalization, and demodulation for 8 layers on the translated data from block 402 (operations of block 404). Channel estimation may be separately performed for the second communication link 126 and the first communication link 124. After that processing, the electronic device 10 may perform channel decoding operations of block 396. After channel decoding, the electronic device 10, via the processor 12, may transmit the processed incoming data 90 for use by downstream circuitry external to the processor 12 and/or a RF front end performing the processing operations.

Elaborating now on yet another example multi-RAT translator 122, FIG. 26 is a block diagram of another example multi-RAT translator 122 that adds channel estimation and MIMO equalization based on first RAT 128 parameters before translation and FIG. 27 is the corresponding electronic device 10 block diagram, which are referred to together for ease of disclosure, where the electronic device 10 performs channel estimation and MIMO equalization based on second RAT 130 parameters before reverse translation Similar to the other examples, the first RAT 128 transmit signal 70A is received and processed by similar operations of blocks 230, 232, and 310. Once processed, the multi-RAT translator 122 may perform channel estimation and MIMO equalization operations of block 410. The multi-RAT translator 122 then translates and processes translated signals further for transmission to the electronic device 10 (operations of blocks 236, 360, 312, and 242).

The electronic device 10 may receive and process the second RAT 130 transmit signal 70B from the multi-RAT translator 122 (operations of blocks 250, 252, 370, 372, and 258). Once translated, the electronic device 10 may perform demodulation for the first RAT 128 data (operations of block 420) and channel decoding (operations of block 322). After channel decoding, the electronic device 10, via the processor 12, may transmit the processed incoming data 90 for use by downstream circuitry external to the processor 12 and/or a RF front end performing the processing operations.

In yet another example, the order of demodulation and reverse translations are exchanged at the electronic device 10 side. To elaborate, FIG. 28 is a block diagram of another example multi-RAT translator 122 that performs channel decoding based on first RAT 128 parameters before translation and channel encoding based on second RAT 130 parameters after translation and FIG. 29 is the corresponding electronic device 10 block diagram, which are referred together herein for ease of disclosure, where the electronic device 10 performs channel decoding before reverse translation based on second RAT 130 parameters. Reception processing operations of this configuration may involve processing the received first RAT 128 transmit signal 70A until channel decoding (e.g., blocks 230, 232, 430) in the bit domain The multi-RAT translator 122 may perform channel decoding of the processed first RAT 128 signals received from the block 430 (operations of block 432). These resulting signals may be translated to the second RAT 130 (operations of block 236). After translation, the multi-RAT translator 122 may perform TX baseband processing (operations of 434). TX baseband processing may be associated with getting a signal ready to be transmitted via the second RAT 130. TX baseband processing may begin from the bit domain and go through the entire TX processing chain including baseband digital processing operations that add a reference signal and/or perform channel coding (e.g., encoding operations), modulation, precoding, resource mapping, adding second RAT 130 RS, OFDM modulation, and the like to generate signals of a second RAT 130 domain and suitable for transmission via the second RAT 130. The multi-RAT translator 122 then translates and processes translated signals further for transmission to the electronic device 10 (operations of blocks 240 and 242).

The electronic device 10 may receive the second RAT 130 transmit signals 70B and perform processing operations according to second RAT 130 parameters (operations of block 250, 252, and 370). The processed bits (e.g., post ADC operation of block 252) may be further processed via physical layer processing operations, such as a transmission error identification operation (e.g., a cyclic redundancy check (CRC)), being delivered to a MAC layer, or the like. The processing and reverse translation operations (operations of block 436 and 258) may both be performed in a bit domain.

It is noted that RX processing operations of the electronic device 10 may correspond to reverse processing operations associated with the RX baseband processing operations. The RX processing operations may include channel decoding, removing a reference signal, and the like to process a received RF signal into a signal usable by circuitry and software of the electronic device 10 (e.g., user equipment).

It is noted that the examples of FIGS. 28-29 may be the relatively most complex implementation of the DL multi-RAT translator 122 among the five options. Despite the complexity, the multi-RAT translator 122 of FIG. 26 may be desired to be implemented since it may bring system robustness due to the channel decoding/encoding process being performed at the multi-RAT translator 122.

Keeping the foregoing in mind, the previously described examples have focused on the translation to multiplexing gain. Following the same principles, the translation to diversity gain may be achieved as well. Moreover, it can be a combination of multiplexing and diversity gain.

In the above systems, the electronic device 10 may process and/or decode the data received from the multi-RAT translators 122. In some cases, the electronic device 10 may process and/or decode the data received from both the multi-RAT translators 122 and the base station 104. It is noted that when the base station 104 transmits data to the multi-RAT translators 122 in the first communication link 124, the electronic device 10 may be able to receive the data as well depending on the propagation conditions. In such cases, the electronic device 10 can combine the received data from both the base station 104 and multi-RAT translators 122 and further improve its decoding performance.

For configurations of FIG. 19-25 (e.g., option 3), FIGS. 26-27 (e.g., option 4), and FIGS. 28-29 (e.g., option 5), the multi-RAT translator 122 may add a second communication link 126 RS, which may be used to enable channel estimation of the second communication link 126 by the electronic device 10 when receiving the signals. There may be different ways (e.g., shown in FIG. 30 and/or FIG. 32) to transmit the RS from the multi-RAT translators 122 of FIG. 19-25 (e.g., option 3), FIGS. 26-27 (e.g., option 4), and FIGS. 28-29 (e.g., option 5), or one or more of the other multi-RAT translators 122 described herein.

For example, FIG. 30 is a timing diagram of different timing slots associated with a Physical Downlink Shared Channel (PDSCH) scheduling over a subset of resources (e.g., represented via axis 200). FIG. 30 illustrates how additional time, frequency and/or code domain resources are used to carry the second communication link 126 RS. FIG. 31 is a flowchart of a method for a time synchronization operation that may utilize the slot configuration of FIG. 30.

In the second example, FIG. 32 is a timing diagram of different timing slots associated with hybrid automatic repeat request (HARQ) feedback scheduling (e.g., represented via axis 200) and FIG. 33 is a flowchart of a method to utilize the HARQ feedback operations of FIG. 32. FIG. 32 illustrates how some of the second RAT 130 resources after translation that carry the first communication link 124 data (e.g., the data received at a multi-RAT translator 122) are punctured to transmit the second communication link 126 RS.

FIGS. 30-33 may each use PDCCH and Physical Downlink Shared Channel (PDSCH) scheduling, (e.g., the use of slot 0 and a downlink control indicator (DCI) of k0). In 5G NR, k0 may be defined as the slot offset between the DL slot where the PDCCH (e.g., including a DCI) for DL scheduling is sent (e.g., slot 0 or before slot 0) and the DL slot where the associated PDSCH data is scheduled (e.g., here slot 2). In 5G NR, the value of k0 may be relatively flexible (e.g., PDCCH message and its associated PDSCH message may not have to be transmitted in the same DL slot—for example, here the PDDCH is transmitted before slot 0 and the associated PDSCH message transmission is received at slot 2). In addition, the currently used k0 value may be dynamically indicated in the DCI carried by a PDCCH message. In FIG. 30 and FIG. 32, k0 equals two slots.

As described above, multi-RAT translator 122 may be used to assist data transmission. Indeed, PDCCH decoding may be performed at the electronic device 10 and may be blind to the multi-RAT translator 122. Multi-RAT translator 122 time synchronization and operations are elaborated on in FIG. 31.

Time synchronization operations of method 450 of FIG. 31 may be performed between the base station 104 and the electronic device 10. As described herein, the method 450 is performed by both the base station 104 and the electronic device, and may be based on signals communicated via the multi-RAT translator 122. It is noted that in a given implementation, different portions of the method 450 may be performed by the base station 104, the electronic device 10, and the multi-RAT translator 122, where together the method 450 enables the synchronization of operations between the base station 104, the electronic device, and the multi-RAT translator 122, even while the PDCCH decoding is blind to the multi-RAT translator 122. It is noted that the operations shown via the method 450 may include different or additional operations. Moreover, the operations of the method 450 may be performed by any suitable device and/or in any suitable order. The method 450 may jointly use electronic device 10 control and a local synchronization operation performed via a multi-RAT translator 122.

With this method 450, a base station 104 may first send a PDCCH message with a k0 greater than 0 to the electronic device 10 (operations of block 452). This PDCCH message may imply that DL data and its associated control information are not sent in the same slot. Based on an indication of the k0 received from base station 104 via the PDCCH message, the electronic device 10 may determine a time shift $T_\delta$ and may signal it to the multi-RAT translators 122 (operations of block 454). The time shift $T_\delta$ can be reflected by the number of slots/symbols or the absolute time duration. With $T_\delta$, the multi-RAT translators 122 may know when to start receiving DL data from the base station 104 and when to perform local control operations algorithms (e.g., CP-based or RS-based synchronization schemes), such as locating associated fast Fourier transform (FFT) windows and locating DL data samples in time domain (operations of block 456).

Regarding frequency synchronization, a multi-RAT translator 122 may be synchronized to the electronic device 10 using various primary-secondary device synchronization algorithms, where the electronic device 10 may be presumed to be synchronized to the base station 104. In this way, the multi-RAT translator 122 may be synchronized to the base station 104 as well.

FIGS. 32-33 may illustration operations associated with receiving HARQ feedback in multi-RAT translator 122 assisted DL transmission. 5G NR HARQ feedback scheduling may use a k1 parameter. In 5G NR, k1 may be a slot offset between the DL slot where data is scheduled on a PDSCH message and the UL slot where ACK/NACK feedback message for the PDSCH message needs to be sent. In addition, the currently used k1 value is dynamically indicated in the DCI carried by the PDCCH message. In FIG. 32, k1 equals three slots and k0 equals two slots. As shown in FIG. 32, the associated PDSCH message transmission corresponding to slot 2 may be acknowledged by the slot 5 via acknowledge feedback (ACK/NACK) message.

The HARQ ACK/NACK feedback message may be sent from the electronic device 10 directly to the base station 104 10, bypassing the multi-RAT translator 122, which may simplify the protocol of multi-RAT assisted DL transmission. The ACK/NACK feedback message may be sent via the FR1 spectrum without translation into a different spectrum via the multi-RAT translator 122. More specifically, after the electronic device 10 receives and decodes the data from DL multi-RAT translators 122, it may send an ACK/NACK feedback message back to the base station 104 at the UL slot indicated by k1 (e.g., slot 2) received in the PDCCH DCI message (to be received by the base station 104 by slot 5). To make sure that the electronic device 10 will have enough time to receive and decode the data sent from the multi-RAT translators 122, the electronic device may signal to the base station 104 a k1 value that the electronic device has predicted is the smallest k1 value that may be used to provide suitable amounts of time to receive and decode the data based on network configurations.

The flowchart of the method 470 in FIG. 33 accompanies the systems and methods illustrated in FIG. 32. As described herein, the method 470 is performed by both the base station 104 and the electronic device 10, and may be based on signals communicated via the multi-RAT translator 122. It is noted that in a given implementation, different portions of the method 470 may be performed by the base station 104, the electronic device 10, and the multi-RAT translator 122, where together the method 470 enables the synchronization of operations between the base station 104, the electronic device 10, and the multi-RAT translator 122. It is noted that the operations shown may include different or additional operations. Moreover, the operations may be performed by any suitable device and/or in any suitable order. The method 470 may jointly use electronic device 10 control and a local synchronization operation performed via a multi-RAT translator 122.

In the method of FIG. 31, an end-user electronic device 10 may signal to a base station 104 a minimum k1 that may be used and still meet timing configurations of a communication network (e.g., 5G NR) (operations of block 472). The base station 104 may, in response, send a PDCCH message including a proper k1 determined based on the indication of the minimum k1 from the end-user electronic device 10 (operations of block 474). The end-user electronic device 10 may receive the indication of the proper k1 in the PDCCH message. Based on the PDCCH message, the end-user electronic device 10 may receive and decode data from the multi-RAT translators 122 (operations of block 476). After receiving the transmission, the end-user electronic device 10 may generate and transmit the ACK/NACK message feedback to the base station 104 at the UL slot indicated by the proper k1 in the PDCCH message, thereby signaling a completed communication with the multi-RAT translator 122 (operations of block 478).

Systems and methods of the present disclosure proposes a new type of communication network entity—a multi-RAT translator. The multi-RAT translator may assist DL data transmission between an end-user electronic device and a base station/network-side device. A system using the multi-RAT translator, may include two hops of an end-to-end link, where a first communication link is between the base station and the multi-RAT translator(s), and where a second communication link is between the multi-RAT translators and the end-user electronic device. The different hops may use different RATs to enable translation of signals communicated between the base station and the electronic device. In particular, the two hops may use different frequency bands. The first communication link may use a relatively lower frequency band while the second communication link may use a relatively higher frequency band. Moreover, discussed herein are various possible implementations of the multi-RAT translator and their corresponding end-user processing. The proposed DL multi-RAT translator may efficiently make use of higher frequency bands (e.g., FR2 or sub-THz) to achieve higher data rate, improved reliability and extended coverage, especially for indoor users. Moreover, the implementation complexity of multi-RAT translator may be relatively low, which may reduce implementation and deployment costs associated with integrating different frequency spectrums into a wireless communication network Keeping the foregoing in mind, systems and methods described herein may include a sub-THz integrated circuit and antenna system that may interface with both 6G spectrums and 5G NR spectrums. Quality of these communications may further improve with suitable communication coordination between timing slots allocated for respective 6G receive operations, 6G transmit operations, 6G sensing operations, 5G NR receive operations, and 5G NR transmit operations, or a combination thereof. By using the systems and methods described herein, some existing circuitry designs, such as MLB traces, silicon molds and manufacturing processes, flex cables, and the like, may be reused and applied to 6G-enabled systems. In this way, both the second front end circuit and the first front end circuit may operate based on signals received via the shared flex cable(s). This reuse may reduce costs and complexity of bringing this new technology to market. Furthermore, sharing these systems with 5G NR operations and 6G operations may be relatively less complex than other 6G systems in development with a smaller footprint, where having a small footprint is a relatively large advantage in the portable electronic technical market.

In an embodiment, an electronic device comprises a receiver, a transmitter, and processing circuitry coupled to the receiver and the transmitter. The processing circuitry is configured to receive a first signal from a base station having a first frequency in a first frequency spectrum at the receiver, determine a time shift based on the first signal, and transmit an indication of the time shift to a translator device using a second signal having a second frequency in a second frequency spectrum at the transmitter.

The processing circuitry may be configured to receive a third signal from the translator device corresponding to a communication from the base station at the receiver after transmitting the indication of the time shift to the translator device at the transmitter.

The first signal may comprise an indication of a slot count corresponding to when the base station is configured to downlink data via the first frequency spectrum.

The processing circuitry may be configured to determine the time shift based on the indication of the slot count, and receive the downlink data from the base station via the second frequency spectrum based on the time shift.

The processing circuitry may be configured to generate one or more fourth signals configured to align a frequency of the translator device to the second frequency in the second frequency spectrum, and transmit the one or more fourth signals to the translator device at the transmitter.

The processing circuitry may be configured to receive one or more fifth signals at the receiver from the base station, and align the receiver to the second frequency based on the one or more fifth signals.

The first frequency spectrum may comprise frequencies between 0.41 gigahertz (GHz) and 7.125 GHz, and wherein the second frequency spectrum comprises frequencies between 24 gigahertz and 52.6 GHz.

The first signal may comprise a Downlink Control Indication that defines the time shift.

The first signal may comprise a Physical Downlink Control Channel message.

In another embodiment, a system comprises a first device configured to use a first frequency spectrum, a second device configured to use a second frequency spectrum, and an intermediary device communicatively coupled to the first device and the second device. The intermediary device is configured to synchronize to timing used by the first device on the first frequency spectrum based on one or more signals received from the second device via the second frequency spectrum.

The second device may be configured to determine a minimum time duration between downlink data that the second device is configured to process, transmit an indication of the minimum time duration to the first device using the first frequency spectrum, receive an indication of a selected time duration from the first device, the selected time duration being no less than the minimum time duration and defining a downlink timing to be used by the first device, transmit the indication of the selected time duration to the intermediary device via the second frequency spectrum, and transmit an acknowledgment signal to the first device based on the selected time duration. The one or more signals may comprise the indication of the selected time duration.

The first device may be configured to receive the indication of the minimum time duration from the second device, select a time duration based on one or more parameters of the first frequency spectrum and the minimum time duration, transmit the indication of the selected time duration to the second device, receive the acknowledgement signal from the second device, and transmit an input signal having a first frequency of the first frequency spectrum.

The intermediary device may be configured to receive the indication of the selected time duration from the second device via the second frequency spectrum, receive the input signal from the first device via the first frequency spectrum based on the selected time duration, generate an output signal having a second frequency of the second frequency spectrum based on the input signal, and transmit the output signal to the second device via the second frequency spectrum.

The second device may be configured to receive an initialization signal from the first device having a first frequency in the first frequency spectrum, determine a time shift based on the initialization signal, and transmit an indication of the time shift to a translator device using a signal having a second frequency in the second frequency spectrum.

The initialization signal may comprise a Downlink Control Indication that defines the time shift.

In yet another embodiment, a method of operating a user equipment to synchronize to a communication network comprises receiving a first message from the communication network at a receiver, the first message comprising an indication of a slot scheduling, generating an indication of a time shift based on the indication of the slot scheduling, the indication of the time shift corresponding to when a multi-radio access technology (RAT) translator is to expect to receive downlink communications from the communication network, and transmitting the indication of the time shift to the RAT translator at a transmitter.

Receiving the first message may comprise receiving, at the receiver, a Downlink Control Indication that defines the slot scheduling from the communication network having a first frequency in a first frequency spectrum.

The method may comprise receiving the first message. The first message may comprise a first slot indication and a second slot indication.

The method may comprise receiving the first message. The first message may comprise a first slot indication and a second slot indication different from the first slot indication.

The method may comprise generating a feedback acknowledgement signal based on the first message, and transmitting the feedback acknowledgement signal to the communication network at an uplink time period based on the indication of the slot scheduling at the transmitter.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. An electronic device comprising:
   a receiver;
   a transmitter; and
   processing circuitry coupled to the receiver and the transmitter, the processing circuitry configured to
   receive a signal from a base station having a first frequency in a first frequency spectrum at the receiver, convert the signal from the first frequency to a second frequency in a second frequency spectrum, and
   transmit the signal having the second frequency to user equipment using the transmitter based on a previously received scheduling data including a time shift from the user equipment, the scheduling data generated based on a Physical Downlink Control Channel (PDCCH) message directly received by the user equipment from the base station.

2. The electronic device of claim 1, wherein the first frequency spectrum comprises frequencies between 0.41 gigahertz (GHz) and 7.125 GHZ, and wherein the second frequency spectrum comprises frequencies between 24 GHz and 52.6 GHz.

3. The electronic device of claim 1, wherein the first frequency spectrum comprises frequencies between 0.41 gigahertz (GHz) and 7.125 GHz, and wherein the second frequency spectrum comprises frequencies between 100 GHz and 1000 GHz.

4. The electronic device of claim 1, wherein the processing circuitry is configured to convert the signal from the first frequency to the second frequency by performing an analog-to-digital conversion, a cyclic prefix (CP) removal operation, a demodulation operation, a modulation operation, a baseband digital processing operation, reference signal addition operation, a channel coding operation, or any combination thereof.

5. The electronic device of claim 1, wherein the processing circuitry is configured to convert the signal from the first frequency to the second frequency at least in part by
   removing a first cyclic prefix (CP) of the signal to generate a first signal,
   translating the first signal from the first frequency to the second frequency to generate a second signal, and
   converting the second signal to an analog signal to generate the signal having the second frequency.

6. The electronic device of claim 5, wherein the processing circuitry is configured to translate the first signal from the first frequency to the second frequency by changing a carrier frequency of the first signal from the first frequency to the second frequency, the second frequency spectrum corresponding to frequency multiplexing operations.

7. The electronic device of claim 5, wherein the processing circuitry is configured to demodulate the first signal before translating the first signal to the second frequency.

8. The electronic device of claim 1, wherein the processing circuitry is configured to add a reference signal to the signal having the second frequency prior to transmission.

9. The electronic device of claim 1, wherein the processing circuitry is configured to convert a plurality of signals comprising the signal from a first number of layers to a second number of layers corresponding to the second frequency spectrum prior to transmission to the user equipment.

10. A method comprising:
   receiving, via a translator device configured to intercept communications between a base station and user equipment, an input signal from the base station via a first frequency spectrum;
   generating, via the translator device, an output signal communicable on a second frequency spectrum based on the input signal;
   receiving, via the translator device, scheduling data from the user equipment, the scheduling data including a time shift, the scheduling data generated based on a Physical Downlink Control Channel (PDCCH) message directly received by the user equipment from the base station; and transmitting, via the translator device, the output signal to the user equipment via the second frequency spectrum based on the scheduling data.

11. The method of claim 10, comprising:

receiving, via the translator device, the input signal via an antenna;

converting, via the translator device, the input signal to a digital domain to generate a digital signal;

removing, via the translator device, a cyclic prefix associated with the digital signal to generate an intermediate signal;

demodulating, via the translator device, the intermediate signal to generate a second intermediate signal; and translating, via the translator device, the second intermediate signal between the first frequency spectrum and the second frequency spectrum to generate the output signal communicable on the second frequency spectrum.

12. The method of claim 11, comprising adding, via the translator device, a reference signal associated with the second frequency spectrum to the output signal before transmitting via the second frequency spectrum.

13. The method of claim 10, wherein generating, via the translator device, the output signal comprises generating, via the translator device, the output signal communicable on the second frequency spectrum based on the input signal and a conversion from a spatial diversity data format to a frequency diversity data format.

14. The method of claim 10, wherein generating, via the translator device, the output signal comprises translating between a spatial multiplexing data format and a time multiplexing data format.

15. A system comprising:

a first device configured to use a first frequency spectrum;

a second device configured to use a second frequency spectrum; and an intermediary device coupled to the first device and the second device, the intermediary device configured to receive a first signal having a first frequency of the first frequency spectrum from the first device, generate a second signal having a second frequency of the second frequency spectrum from the first device based on the first signal, receive scheduling data from the second device, the scheduling data including a time shift, the scheduling data generated based on a Physical Downlink Control Channel (PDCCH) message directly received by the second device from the first device, and transmit the second signal to the second device based on the scheduling data.

16. The system of claim 15, wherein the second device is configured to use the second frequency spectrum and the first frequency spectrum, wherein the second device comprises first user equipment, and wherein the intermediary device comprises second user equipment.

17. The system of claim 15, wherein the second frequency spectrum comprises frequencies higher than the first frequency spectrum.

18. The system of claim 15, wherein the intermediary device is configured to generate the second signal having the second frequency based on adjusting the first signal to have a frequency diversity data format.

19. The system of claim 15, wherein the second device is configured to receive the second signal having the second frequency of the second frequency spectrum, and generate a down-converted signal having the first frequency of the first frequency spectrum based on the second signal.

* * * * *